United States Patent
Asaban et al.

(10) Patent No.: US 12,475,662 B2
(45) Date of Patent: Nov. 18, 2025

(54) STEREOSCOPIC DISPLAY AND DIGITAL LOUPE FOR AUGMENTED-REALITY NEAR-EYE DISPLAY

(71) Applicant: AUGMEDICS LTD., Yokneam Illit (IL)

(72) Inventors: Asaf Asaban, Haifa (IL); Yaacov Hillel Rothschild, Kiryat Yearim (IL); Nissan Elimelech, Beerotaim (IL); Stuart Wolf, Yokneam (IL)

(73) Assignee: AUGMEDICS LTD., Yokneam Illit (IL)

( * ) Notice: Subject to any disclaimer, the term of this patent is extended or adjusted under 35 U.S.C. 154(b) by 0 days.

(21) Appl. No.: 18/683,676

(22) PCT Filed: Aug. 18, 2022

(86) PCT No.: PCT/IB2022/057735
§ 371 (c)(1),
(2) Date: Feb. 14, 2024

(87) PCT Pub. No.: WO2023/021450
PCT Pub. Date: Feb. 23, 2023

(65) Prior Publication Data
US 2024/0377640 A1   Nov. 14, 2024

Related U.S. Application Data

(60) Provisional application No. 63/281,677, filed on Nov. 21, 2021, provisional application No. 63/236,244, (Continued)

(51) Int. Cl.
*G06T 19/00* (2011.01)
*A61B 34/20* (2016.01)
(Continued)

(52) U.S. Cl.
CPC ............ *G06T 19/006* (2013.01); *A61B 34/20* (2016.02); *A61B 90/37* (2016.02);
(Continued)

(58) Field of Classification Search
CPC ............ G02B 27/0172; H04N 13/239; H04N 13/344; A61B 90/361; A61B 90/37; A61B 5/0077

See application file for complete search history.

(56) References Cited

U.S. PATENT DOCUMENTS

| 3,101,715 A | 8/1963 | Glassman |
| 3,690,776 A | 9/1972 | Zaporoshan |

(Continued)

FOREIGN PATENT DOCUMENTS

| CA | 3022448 A1 | 2/2018 |
| CA | 3034314 A1 | 2/2018 |

(Continued)

OTHER PUBLICATIONS

U.S. Appl. No. 15/896102 U.S. Pat. No. 10,134,166, filed Feb. 14, 2018 Nov. 20, 2018, Combining Video-Based and Optic-Based Augmented Reality in a Near Eye Display.
(Continued)

*Primary Examiner* — Yuzhen Shen
(74) *Attorney, Agent, or Firm* — Dinsmore & Shohl LLP

(57) ABSTRACT

Disclosed herein are implementations for a digital stereoscopic display and digital loupes utilizing the digital stereoscopic display. The stereoscopic display may include display of magnified images.

19 Claims, 6 Drawing Sheets

Related U.S. Application Data filed on Aug. 24, 2021, provisional application No. 63/236,241, filed on Aug. 24, 2021, provisional application No. 63/234,272, filed on Aug. 18, 2021.

(51) Int. Cl.

| | | |
|---|---|---|
| *A61B 90/00* | (2016.01) | |
| *G02B 27/01* | (2006.01) | |
| *G06T 7/00* | (2017.01) | |
| *G06T 7/30* | (2017.01) | |
| *G06T 7/521* | (2017.01) | |
| *G06T 7/55* | (2017.01) | |
| *G06T 7/593* | (2017.01) | |
| *G06T 7/62* | (2017.01) | |
| *G06T 7/73* | (2017.01) | |
| *H04N 13/128* | (2018.01) | |
| *H04N 13/156* | (2018.01) | |
| *H04N 13/167* | (2018.01) | |
| *H04N 13/239* | (2018.01) | |
| *H04N 13/344* | (2018.01) | |
| *H04N 13/383* | (2018.01) | |
| *H04N 23/11* | (2023.01) | |
| *A61B 34/10* | (2016.01) | |

(52) U.S. Cl.

CPC ........ *G02B 27/0172* (2013.01); *G06T 7/0016* (2013.01); *G06T 7/30* (2017.01); *G06T 7/521* (2017.01); *G06T 7/55* (2017.01); *G06T 7/593* (2017.01); *G06T 7/62* (2017.01); *G06T 7/73* (2017.01); *H04N 13/128* (2018.05); *H04N 13/156* (2018.05); *H04N 13/167* (2018.05); *H04N 13/239* (2018.05); *H04N 13/344* (2018.05); *H04N 13/383* (2018.05); *H04N 23/11* (2023.01); *A61B 2034/107* (2016.02); *A61B 2090/365* (2016.02); *A61B 2090/367* (2016.02); *A61B 2090/371* (2016.02); *A61B 2090/373* (2016.02); *G02B 2027/0134* (2013.01); *G02B 2027/0138* (2013.01); *G02B 2027/014* (2013.01); *G02B 2027/0141* (2013.01); *G02B 2027/0178* (2013.01); *G06T 2200/04* (2013.01); *G06T 2207/10012* (2013.01); *G06T 2207/10028* (2013.01); *G06T 2207/10081* (2013.01); *G06T 2207/20084* (2013.01); *G06T 2207/30008* (2013.01); *G06T 2207/30012* (2013.01); *G06T 2207/30204* (2013.01); *G06T 2210/12* (2013.01); *G06T 2210/41* (2013.01)

(56) References Cited

U.S. PATENT DOCUMENTS

| | | |
|---|---|---|
| 4,459,358 A | 7/1984 | Berke |
| 4,711,512 A | 12/1987 | Upatnieks |
| 4,863,238 A | 9/1989 | Brewster |
| 4,944,739 A | 7/1990 | Torre |
| 5,100,420 A | 3/1992 | Green et al. |
| 5,147,365 A | 9/1992 | Whitlock et al. |
| 5,357,292 A | 10/1994 | Wiedner |
| 5,410,802 A | 5/1995 | Buckley |
| 5,441,042 A | 8/1995 | Putman |
| 5,442,146 A | 8/1995 | Bell et al. |
| 5,510,832 A | 4/1996 | Garcia |
| D370,309 S | 5/1996 | Stucky |
| 5,620,188 A | 4/1997 | McCurry et al. |
| 5,636,255 A | 6/1997 | Ellis |
| 5,665,092 A | 9/1997 | Mangiardi et al. |
| 5,743,731 A | 4/1998 | Lares et al. |
| 5,771,121 A | 6/1998 | Hentschke |
| 5,792,046 A | 8/1998 | Dobrovolny |
| 5,841,507 A | 11/1998 | Barnes |
| 6,006,126 A | 12/1999 | Cosman |
| 6,038,467 A | 3/2000 | De Bliek et al. |
| 6,125,164 A | 9/2000 | Murphy et al. |
| 6,138,530 A | 10/2000 | McClure |
| 6,147,805 A | 11/2000 | Fergason |
| 6,227,667 B1 | 5/2001 | Halldorsson et al. |
| 6,256,529 B1 | 7/2001 | Holupka et al. |
| 6,285,505 B1 | 9/2001 | Melville et al. |
| 6,314,310 B1 | 11/2001 | Ben-Haim et al. |
| 6,349,001 B1 | 2/2002 | Spitzer |
| 6,444,192 B1 | 9/2002 | Mattrey |
| 6,447,503 B1 | 9/2002 | Wynne et al. |
| 6,449,090 B1 | 9/2002 | Omar et al. |
| 6,456,405 B2 | 9/2002 | Horikoshi et al. |
| 6,456,868 B2 | 9/2002 | Saito et al. |
| 6,474,159 B1 | 11/2002 | Foxlin et al. |
| 6,518,939 B1 | 2/2003 | Kikuchi |
| 6,527,777 B2 | 3/2003 | Justin |
| 6,529,331 B2 | 3/2003 | Massof et al. |
| 6,549,645 B1 | 4/2003 | Oikawa et al. |
| 6,578,962 B1 | 6/2003 | Amir et al. |
| 6,609,022 B2 | 8/2003 | Mlsmeier et al. |
| 6,610,009 B2 | 8/2003 | Person |
| D480,476 S | 10/2003 | Martinson et al. |
| 6,659,611 B2 | 12/2003 | Amir et al. |
| 6,675,040 B1 | 1/2004 | Cosman |
| 6,683,584 B2 | 1/2004 | Ronzani et al. |
| 6,690,964 B2 | 2/2004 | Bieger et al. |
| 6,714,810 B2 | 3/2004 | Grzeszczuk et al. |
| 6,737,425 B1 | 5/2004 | Yamamoto et al. |
| 6,740,882 B2 | 5/2004 | Weinberg |
| 6,757,068 B2 | 6/2004 | Foxlin |
| 6,759,200 B1 | 7/2004 | Stanton, Jr. |
| 6,847,336 B1 | 1/2005 | Lemelson et al. |
| 6,856,324 B2 | 2/2005 | Sauer et al. |
| 6,856,826 B2 | 2/2005 | Seeley et al. |
| 6,891,518 B2 | 5/2005 | Sauer et al. |
| 6,900,777 B1 | 5/2005 | Hebert et al. |
| 6,919,867 B2 | 7/2005 | Sauer |
| 6,921,167 B2 | 7/2005 | Nagata |
| 6,966,668 B2 | 11/2005 | Cugini et al. |
| 6,980,849 B2 | 12/2005 | Sasso |
| 6,993,374 B2 | 1/2006 | Sasso |
| 6,997,552 B1 | 2/2006 | Hung |
| 6,999,239 B1 | 2/2006 | Martins et al. |
| 7,000,262 B2 | 2/2006 | Bielefeld |
| 7,035,371 B2 | 4/2006 | Boese et al. |
| 7,043,961 B2 | 5/2006 | Pandey et al. |
| 7,072,435 B2 | 7/2006 | Metz et al. |
| 7,103,233 B2 | 9/2006 | Stearns |
| 7,107,091 B2 | 9/2006 | Jutras et al. |
| 7,112,656 B2 | 9/2006 | Desnoyers et al. |
| 7,141,812 B2 | 11/2006 | Appleby et al. |
| 7,157,459 B2 | 1/2007 | Ohta et al. |
| 7,169,785 B2 | 1/2007 | Timmer et al. |
| 7,171,255 B2 | 1/2007 | Holupka et al. |
| 7,176,936 B2 | 2/2007 | Sauer et al. |
| 7,187,792 B2 | 3/2007 | Fu et al. |
| 7,190,331 B2 | 3/2007 | Genc et al. |
| 7,194,295 B2 | 3/2007 | Vilsmeier |
| 7,215,322 B2 | 5/2007 | Genc et al. |
| 7,229,078 B2 | 6/2007 | Lechot |
| 7,231,076 B2 | 6/2007 | Fu et al. |
| 7,235,076 B2 | 6/2007 | Pacheco |
| 7,239,330 B2 | 7/2007 | Sauer et al. |
| 7,241,292 B2 | 7/2007 | Hooven |
| 7,259,266 B2 | 8/2007 | Carter et al. |
| 7,260,426 B2 | 8/2007 | Schweikard et al. |
| 7,269,192 B2 | 9/2007 | Hayashi |
| 7,281,826 B2 | 10/2007 | Huang |
| 7,315,636 B2 | 1/2008 | Kuduvalli |
| 7,320,556 B2 | 1/2008 | Vagn-Erik |
| 7,330,578 B2 | 2/2008 | Wang et al. |
| 7,359,535 B2 | 4/2008 | Salla et al. |
| 7,364,314 B2 | 4/2008 | Nilsen et al. |
| 7,366,934 B1 | 4/2008 | Narayan et al. |
| 7,379,077 B2 | 5/2008 | Bani-Hashemi et al. |

(56) References Cited

U.S. PATENT DOCUMENTS

| | | | |
|---|---|---|---|
| 7,431,453 B2 | 10/2008 | Hogan |
| 7,435,219 B2 | 10/2008 | Kim |
| 7,450,743 B2 | 11/2008 | Sundar et al. |
| 7,458,977 B2 | 12/2008 | McGinley et al. |
| 7,462,852 B2 | 12/2008 | Appleby et al. |
| 7,493,153 B2 | 2/2009 | Ahmed et al. |
| 7,505,617 B2 | 3/2009 | Fu et al. |
| 7,507,968 B2 | 3/2009 | Wollenweber et al. |
| 7,518,136 B2 | 4/2009 | Appleby et al. |
| 7,525,735 B2 | 4/2009 | Sottilare et al. |
| D592,691 S | 5/2009 | Chang |
| D592,692 S | 5/2009 | Chang |
| D592,693 S | 5/2009 | Chang |
| 7,536,216 B2 | 5/2009 | Geiger et al. |
| 7,542,791 B2 | 6/2009 | Mire et al. |
| 7,556,428 B2 | 7/2009 | Sukovic et al. |
| 7,557,824 B2 | 7/2009 | Holliman |
| 7,563,228 B2 | 7/2009 | Ma et al. |
| 7,567,834 B2 | 7/2009 | Clayton et al. |
| 7,570,791 B2 | 8/2009 | Frank et al. |
| 7,586,686 B1 | 9/2009 | Hall |
| D602,620 S | 10/2009 | Cristoforo |
| 7,605,826 B2 | 10/2009 | Sauer |
| 7,606,613 B2 | 10/2009 | Simon et al. |
| 7,607,775 B2 | 10/2009 | Hermanson et al. |
| 7,620,223 B2 | 11/2009 | Xu et al. |
| 7,623,902 B2 | 11/2009 | Pacheco |
| 7,627,085 B2 | 12/2009 | Boyden et al. |
| 7,630,753 B2 | 12/2009 | Simon et al. |
| 7,633,501 B2 | 12/2009 | Wood et al. |
| 7,645,050 B2 | 1/2010 | Wilt et al. |
| 7,653,226 B2 | 1/2010 | Guhring et al. |
| 7,657,075 B2 | 2/2010 | Viswanathan |
| 7,689,019 B2 | 3/2010 | Boese et al. |
| 7,689,042 B2 | 3/2010 | Brunner et al. |
| 7,689,320 B2 | 3/2010 | Prisco et al. |
| 7,699,486 B1 | 4/2010 | Beiner |
| 7,699,793 B2 | 4/2010 | Goette et al. |
| 7,719,769 B2 | 5/2010 | Sugihara et al. |
| D617,825 S | 6/2010 | Chang |
| 7,734,327 B2 | 6/2010 | Colquhoun |
| D619,285 S | 7/2010 | Cristoforo |
| 7,751,865 B2 | 7/2010 | Jascob et al. |
| 7,758,204 B2 | 7/2010 | Klipstein et al. |
| 7,768,702 B2 | 8/2010 | Hirose et al. |
| 7,769,236 B2 | 8/2010 | Fiala |
| 7,773,074 B2 | 8/2010 | Arenson et al. |
| 7,774,044 B2 | 8/2010 | Sauer et al. |
| 7,822,483 B2 | 10/2010 | Stone et al. |
| D628,307 S | 11/2010 | Krause-Bonte |
| 7,826,902 B2 | 11/2010 | Stone et al. |
| 7,831,073 B2 | 11/2010 | Fu et al. |
| 7,831,096 B2 | 11/2010 | Williamson, Jr. |
| 7,835,778 B2 | 11/2010 | Foley et al. |
| 7,835,784 B2 | 11/2010 | Mire et al. |
| 7,837,987 B2 | 11/2010 | Shi et al. |
| 7,840,093 B2 | 11/2010 | Fu et al. |
| 7,840,253 B2 | 11/2010 | Tremblay et al. |
| 7,840,256 B2 | 11/2010 | Lakin et al. |
| 7,853,305 B2 | 12/2010 | Simon et al. |
| 7,854,705 B2 | 12/2010 | Pawluczyk et al. |
| 7,857,271 B2 | 12/2010 | Lees |
| 7,860,282 B2 | 12/2010 | Boese et al. |
| D630,766 S | 1/2011 | Harbin |
| 7,865,269 B2 | 1/2011 | Prisco et al. |
| 7,874,686 B2 | 1/2011 | Rossner et al. |
| 7,881,770 B2 | 2/2011 | Melkent et al. |
| 7,893,413 B1 | 2/2011 | Appleby et al. |
| 7,894,649 B2 | 2/2011 | Fu et al. |
| 7,920,162 B2 | 4/2011 | Masini et al. |
| 7,922,391 B2 | 4/2011 | Essenreiter et al. |
| 7,938,553 B1 | 5/2011 | Beiner |
| 7,945,310 B2 | 5/2011 | Gattani et al. |
| 7,953,471 B2 | 5/2011 | Clayton et al. |
| 7,969,383 B2 | 6/2011 | Eberl et al. |
| 7,974,677 B2 | 7/2011 | Mire et al. |
| 7,985,756 B2 | 7/2011 | Barlow et al. |
| 7,991,557 B2 | 8/2011 | Liew et al. |
| 7,993,353 B2 | 8/2011 | Roner et al. |
| 7,996,064 B2 | 8/2011 | Simon et al. |
| 8,004,524 B2 | 8/2011 | Deinzer |
| 8,021,300 B2 | 9/2011 | Ma et al. |
| 8,022,984 B2 | 9/2011 | Cheong et al. |
| 8,045,266 B2 | 10/2011 | Nakamura |
| 8,060,181 B2 | 11/2011 | Rodriguez et al. |
| 8,068,581 B2 | 11/2011 | Boese et al. |
| 8,068,896 B2 | 11/2011 | Daghighian et al. |
| 8,077,943 B2 | 12/2011 | Williams et al. |
| 8,079,957 B2 | 12/2011 | Ma et al. |
| 8,081,812 B2 | 12/2011 | Kreiser |
| 8,085,075 B2 | 12/2011 | Huffman et al. |
| 8,085,897 B2 | 12/2011 | Morton |
| 8,090,175 B2 | 1/2012 | Fu et al. |
| 8,092,400 B2 | 1/2012 | Warkentine et al. |
| 8,108,072 B2 | 1/2012 | Zhao et al. |
| 8,112,292 B2 | 2/2012 | Simon |
| 8,116,847 B2 | 2/2012 | Gattani et al. |
| 8,120,847 B2 | 2/2012 | Chang |
| 8,121,255 B2 | 2/2012 | Sugiyama |
| 8,155,479 B2 | 4/2012 | Hoffman et al. |
| 8,180,132 B2 | 5/2012 | Gorges et al. |
| 8,180,429 B2 | 5/2012 | Sasso |
| 8,208,599 B2 | 6/2012 | Ye et al. |
| 8,216,211 B2 | 7/2012 | Mathis et al. |
| 8,221,402 B2 | 7/2012 | Francischelli et al. |
| 8,239,001 B2 | 8/2012 | Verard et al. |
| 8,244,012 B2 | 8/2012 | Liang et al. |
| 8,253,778 B2 | 8/2012 | Atsushi |
| 8,271,069 B2 | 9/2012 | Jascob et al. |
| 8,280,491 B2 | 10/2012 | Kuduvalli et al. |
| 8,285,021 B2 | 10/2012 | Boese et al. |
| 8,300,315 B2 | 10/2012 | Kobayashi |
| 8,305,685 B2 | 11/2012 | Heine et al. |
| 8,306,305 B2 | 11/2012 | Porat et al. |
| 8,309,932 B2 | 11/2012 | Haselman et al. |
| 8,317,320 B2 | 11/2012 | Huang |
| 8,328,815 B2 | 12/2012 | Farr et al. |
| 8,335,553 B2 | 12/2012 | Rubner et al. |
| 8,335,557 B2 | 12/2012 | Maschke |
| 8,340,379 B2 | 12/2012 | Razzaque et al. |
| 8,369,925 B2 | 2/2013 | Giesel et al. |
| 8,386,022 B2 | 2/2013 | Jutras et al. |
| 8,394,144 B2 | 3/2013 | Zehavi et al. |
| 8,398,541 B2 | 3/2013 | Dimaio et al. |
| 8,444,266 B2 | 5/2013 | Waters |
| 8,457,719 B2 | 6/2013 | Moctezuma de la Barrera et al. |
| 8,467,851 B2 | 6/2013 | Mire et al. |
| 8,469,902 B2 | 6/2013 | Dick et al. |
| 8,475,470 B2 | 7/2013 | Von Jako |
| 8,494,612 B2 | 7/2013 | Vetter et al. |
| 8,509,503 B2 | 8/2013 | Nahum et al. |
| 8,511,827 B2 | 8/2013 | Hua et al. |
| 8,531,394 B2 | 9/2013 | Maltz |
| 8,540,364 B2 | 9/2013 | Waters |
| 8,545,012 B2 | 10/2013 | Waters |
| 8,548,567 B2 | 10/2013 | Maschke et al. |
| 8,556,883 B2 | 10/2013 | Saleh |
| 8,559,596 B2 | 10/2013 | Thomson et al. |
| 8,567,945 B2 | 10/2013 | Waters |
| 8,571,353 B2 | 10/2013 | Watanabe |
| 8,585,598 B2 | 11/2013 | Razzaque et al. |
| 8,600,001 B2 | 12/2013 | Schweizer |
| 8,600,477 B2 | 12/2013 | Beyar et al. |
| 8,605,199 B2 | 12/2013 | Imai |
| 8,611,988 B2 | 12/2013 | Miyamoto |
| 8,612,024 B2 | 12/2013 | Stone et al. |
| 8,634,897 B2 | 1/2014 | Simon et al. |
| 8,641,621 B2 | 2/2014 | Razzaque et al. |
| 8,643,950 B2 | 2/2014 | König |
| 8,644,907 B2 | 2/2014 | Hartmann et al. |
| 8,674,902 B2 | 3/2014 | Park et al. |
| 8,686,923 B2 | 4/2014 | Eberl et al. |
| 8,690,581 B2 | 4/2014 | Ruf et al. |
| 8,690,776 B2 | 4/2014 | Razzaque et al. |

(56) References Cited

U.S. PATENT DOCUMENTS

| | | |
|---|---|---|
| 8,692,845 B2 | 4/2014 | Fedorovskaya et al. |
| 8,693,632 B2 | 4/2014 | Allison |
| 8,694,075 B2 | 4/2014 | Groszmann et al. |
| 8,699,765 B2 | 4/2014 | Hao et al. |
| 8,705,829 B2 | 4/2014 | Frank et al. |
| 8,737,708 B2 | 5/2014 | Hartmann et al. |
| 8,746,887 B2 | 6/2014 | Shestak et al. |
| 8,764,025 B1 | 7/2014 | Gao |
| 8,784,450 B2 | 7/2014 | Moskowitz et al. |
| 8,786,689 B1 | 7/2014 | Liu |
| D710,545 S | 8/2014 | Wu |
| D710,546 S | 8/2014 | Wu |
| 8,827,934 B2 | 9/2014 | Chopra et al. |
| 8,831,706 B2 | 9/2014 | Fu et al. |
| 8,836,768 B1 | 9/2014 | Rafii et al. |
| 8,838,199 B2 | 9/2014 | Simon et al. |
| 8,848,977 B2 | 9/2014 | Bammer et al. |
| 8,855,395 B2 | 10/2014 | Baturin et al. |
| 8,878,900 B2 | 11/2014 | Yang et al. |
| 8,879,815 B2 | 11/2014 | Miao et al. |
| 8,885,177 B2 | 11/2014 | Ben-Yishai et al. |
| 8,890,772 B2 | 11/2014 | Woo et al. |
| 8,890,773 B1 | 11/2014 | Pederson |
| 8,890,943 B2 | 11/2014 | Lee et al. |
| 8,897,514 B2 | 11/2014 | Feikas et al. |
| 8,900,131 B2 | 12/2014 | Chopra et al. |
| 8,903,150 B2 | 12/2014 | Star-Lack et al. |
| 8,908,952 B2 | 12/2014 | Isaacs et al. |
| 8,911,358 B2 | 12/2014 | Koninckx et al. |
| 8,917,268 B2 | 12/2014 | Johnsen et al. |
| 8,920,776 B2 | 12/2014 | Gaiger et al. |
| 8,922,589 B2 | 12/2014 | Laor |
| 8,941,559 B2 | 1/2015 | Bar-Zeev et al. |
| 8,942,455 B2 | 1/2015 | Chou et al. |
| 8,950,877 B2 | 2/2015 | Northey et al. |
| 8,953,246 B2 | 2/2015 | Koenig |
| 8,965,583 B2 | 2/2015 | Ortmaier et al. |
| 8,969,829 B2 | 3/2015 | Wollenweber et al. |
| 8,989,349 B2 | 3/2015 | Thomson et al. |
| 8,992,580 B2 | 3/2015 | Bar et al. |
| 8,994,729 B2 | 3/2015 | Nakamura |
| 8,994,795 B2 | 3/2015 | Oh |
| 9,004,711 B2 | 4/2015 | Gerolemou |
| 9,005,211 B2 | 4/2015 | Brundobler et al. |
| 9,011,441 B2 | 4/2015 | Bertagnoli et al. |
| 9,057,759 B2 | 6/2015 | Klingenbeck et al. |
| 9,060,757 B2 | 6/2015 | Lawson et al. |
| 9,066,751 B2 | 6/2015 | Sasso |
| 9,081,436 B1 | 7/2015 | Berme et al. |
| 9,084,635 B2 | 7/2015 | Nuckley et al. |
| 9,085,643 B2 | 7/2015 | Svanborg et al. |
| 9,087,471 B2 | 7/2015 | Miao |
| 9,100,643 B2 | 8/2015 | Mcdowall et al. |
| 9,101,394 B2 | 8/2015 | Arata et al. |
| 9,104,902 B2 | 8/2015 | Xu et al. |
| 9,111,175 B2 | 8/2015 | Strommer et al. |
| 9,123,155 B2 | 9/2015 | Cunningham et al. |
| 9,125,556 B2 | 9/2015 | Zehavi et al. |
| 9,129,054 B2 | 9/2015 | Nawana et al. |
| 9,129,372 B2 | 9/2015 | Kriston et al. |
| 9,132,361 B2 | 9/2015 | Smithwick |
| 9,135,706 B2 | 9/2015 | Zagorchev et al. |
| 9,141,873 B2 | 9/2015 | Takemoto |
| 9,142,020 B2 | 9/2015 | Deguise et al. |
| 9,149,317 B2 | 10/2015 | Arthur et al. |
| 9,165,203 B2 | 10/2015 | McCarthy |
| 9,165,362 B2 | 10/2015 | Siewerdsen et al. |
| 9,179,984 B2 | 11/2015 | Teichman et al. |
| D746,354 S | 12/2015 | Chang |
| 9,208,916 B2 | 12/2015 | Appleby et al. |
| 9,220,573 B2 | 12/2015 | Kendrick et al. |
| 9,225,895 B2 | 12/2015 | Kozinski |
| 9,232,982 B2 | 1/2016 | Soler et al. |
| 9,235,934 B2 | 1/2016 | Mandella et al. |
| 9,240,046 B2 | 1/2016 | Carrell et al. |
| 9,244,278 B2 | 1/2016 | Sugiyama et al. |
| 9,247,240 B2 | 1/2016 | Park et al. |
| 9,259,192 B2 | 2/2016 | Ishihara |
| 9,265,572 B2 | 2/2016 | Fuchs et al. |
| 9,269,192 B2 | 2/2016 | Kobayashi |
| 9,283,052 B2 | 3/2016 | Rodriguez Ponce |
| 9,286,730 B2 | 3/2016 | Bar-Zeev et al. |
| 9,289,267 B2 | 3/2016 | Sauer et al. |
| 9,294,222 B2 | 3/2016 | Proctor, Jr. |
| 9,300,949 B2 | 3/2016 | Ahearn |
| 9,305,354 B2 | 4/2016 | Burlon et al. |
| 9,310,591 B2 | 4/2016 | Hua et al. |
| 9,320,474 B2 | 4/2016 | Demri et al. |
| 9,323,055 B2 | 4/2016 | Baillot |
| 9,330,477 B2 | 5/2016 | Rappel |
| 9,335,547 B2 | 5/2016 | Takano et al. |
| 9,335,567 B2 | 5/2016 | Nakamura |
| 9,341,704 B2 | 5/2016 | Picard et al. |
| 9,344,686 B2 | 5/2016 | Moharir |
| 9,349,066 B2 | 5/2016 | Koo et al. |
| 9,349,520 B2 | 5/2016 | Demetriou et al. |
| 9,364,294 B2 | 6/2016 | Razzaque et al. |
| 9,370,332 B2 | 6/2016 | Paladini et al. |
| 9,373,166 B2 | 6/2016 | Azar |
| 9,375,639 B2 | 6/2016 | Kobayashi et al. |
| 9,378,558 B2 | 6/2016 | Kajiwara et al. |
| 9,380,287 B2 | 6/2016 | Nistico et al. |
| 9,387,008 B2 | 7/2016 | Sarvestani et al. |
| 9,392,129 B2 | 7/2016 | Simmons |
| 9,395,542 B2 | 7/2016 | Tilleman et al. |
| 9,398,936 B2 | 7/2016 | Razzaque et al. |
| 9,400,384 B2 | 7/2016 | Griffith |
| 9,414,041 B2 | 8/2016 | Ko et al. |
| 9,424,611 B2 | 8/2016 | Kanjirathinkal et al. |
| 9,424,641 B2 | 8/2016 | Wiemker et al. |
| 9,427,286 B2 | 8/2016 | Siewerdsen et al. |
| 9,438,894 B2 | 9/2016 | Park et al. |
| 9,443,488 B2 | 9/2016 | Borenstein et al. |
| 9,453,804 B2 | 9/2016 | Tahtali |
| 9,456,878 B2 | 10/2016 | Macfarlane et al. |
| 9,465,235 B2 | 10/2016 | Chang |
| 9,468,373 B2 | 10/2016 | Larsen |
| 9,470,908 B1 | 10/2016 | Frankel et al. |
| 9,473,766 B2 | 10/2016 | Douglas et al. |
| 9,492,222 B2 | 11/2016 | Singh |
| 9,495,585 B2 | 11/2016 | Bicer et al. |
| 9,498,132 B2 | 11/2016 | Maier-Hein et al. |
| 9,498,231 B2 | 11/2016 | Haider et al. |
| 9,499,999 B2 | 11/2016 | Nanqing |
| 9,507,155 B2 | 11/2016 | Morimoto |
| 9,513,495 B2 | 12/2016 | Waters |
| 9,521,966 B2 | 12/2016 | Schwartz |
| 9,526,443 B1 | 12/2016 | Berme et al. |
| 9,530,382 B2 | 12/2016 | Simmons |
| 9,532,846 B2 | 1/2017 | Nakamura |
| 9,532,849 B2 | 1/2017 | Anderson et al. |
| 9,533,407 B2 | 1/2017 | Ragner |
| 9,538,962 B1 | 1/2017 | Hannaford et al. |
| 9,545,233 B2 | 1/2017 | Sirpad et al. |
| 9,546,779 B2 | 1/2017 | Rementer |
| 9,547,174 B2 | 1/2017 | Gao et al. |
| 9,547,940 B1 | 1/2017 | Sun et al. |
| 9,557,566 B2 | 1/2017 | Fujimaki |
| 9,560,318 B2 | 1/2017 | Reina et al. |
| 9,561,095 B1 | 2/2017 | Nguyen et al. |
| 9,561,446 B2 | 2/2017 | Brecher |
| 9,565,415 B2 | 2/2017 | Zhang et al. |
| 9,572,661 B2 | 2/2017 | Robin et al. |
| 9,576,398 B1 | 2/2017 | Zehner et al. |
| 9,576,556 B2 | 2/2017 | Simmons |
| 9,581,822 B2 | 2/2017 | Morimoto |
| 9,610,056 B2 | 4/2017 | Lavallee et al. |
| 9,612,657 B2 | 4/2017 | Bertram et al. |
| 9,626,936 B2 | 4/2017 | Bell |
| 9,629,595 B2 | 4/2017 | Walker et al. |
| 9,633,431 B2 | 4/2017 | Merlet |
| 9,645,395 B2 | 5/2017 | Bolas et al. |
| 9,646,423 B1 | 5/2017 | Sun et al. |
| 9,672,597 B2 | 6/2017 | Amiot et al. |

(56) References Cited

U.S. PATENT DOCUMENTS

| | | |
|---|---|---|
| 9,672,607 B2 | 6/2017 | Demri et al. |
| 9,672,640 B2 | 6/2017 | Kleiner |
| 9,675,306 B2 | 6/2017 | Morton |
| 9,675,319 B1 | 6/2017 | Razzaque et al. |
| 9,684,980 B2 | 6/2017 | Royalty et al. |
| 9,690,119 B2 | 6/2017 | Garofolo et al. |
| RE46,463 E | 7/2017 | Fienbloom et al. |
| 9,693,748 B2 | 7/2017 | Rai et al. |
| 9,710,968 B2 | 7/2017 | Dillavou et al. |
| 9,713,502 B2 | 7/2017 | Finkman et al. |
| 9,724,119 B2 | 8/2017 | Hissong et al. |
| 9,724,165 B2 | 8/2017 | Arata et al. |
| 9,726,888 B2 | 8/2017 | Giartosio et al. |
| 9,728,006 B2 | 8/2017 | Varga |
| 9,729,831 B2 | 8/2017 | Birnkrant et al. |
| 9,746,739 B2 | 8/2017 | Alton et al. |
| 9,757,034 B2 | 9/2017 | Desjardins et al. |
| 9,757,087 B2 | 9/2017 | Simon et al. |
| 9,766,441 B2 | 9/2017 | Rappel |
| 9,766,459 B2 | 9/2017 | Alton et al. |
| 9,767,608 B2 | 9/2017 | Lee et al. |
| 9,770,203 B1 | 9/2017 | Berme et al. |
| 9,772,102 B1 | 9/2017 | Ferguson |
| 9,772,495 B2 | 9/2017 | Tam et al. |
| 9,791,138 B1 | 10/2017 | Feinbloom et al. |
| 9,800,995 B2 | 10/2017 | Libin et al. |
| 9,805,504 B2 | 10/2017 | Zhang et al. |
| 9,808,148 B2 | 11/2017 | Miller et al. |
| 9,839,448 B2 | 12/2017 | Reckling et al. |
| 9,844,413 B2 | 12/2017 | Daon et al. |
| 9,851,080 B2 | 12/2017 | Wilt et al. |
| 9,858,663 B2 | 1/2018 | Penney et al. |
| 9,861,446 B2 | 1/2018 | Lang |
| 9,864,214 B2 | 1/2018 | Fass |
| 9,872,733 B2 | 1/2018 | Shoham et al. |
| 9,875,544 B2 | 1/2018 | Rai et al. |
| 9,877,642 B2 | 1/2018 | Duret |
| 9,885,465 B2 | 2/2018 | Nguyen |
| 9,886,552 B2 | 2/2018 | Dillavou et al. |
| 9,886,760 B2 | 2/2018 | Liu et al. |
| 9,892,564 B1 | 2/2018 | Cvetko et al. |
| 9,898,866 B2 | 2/2018 | Fuchs et al. |
| 9,901,414 B2 | 2/2018 | Lively et al. |
| 9,911,187 B2 | 3/2018 | Steinle et al. |
| 9,911,236 B2 | 3/2018 | Bar et al. |
| 9,927,611 B2 | 3/2018 | Rudy et al. |
| 9,928,629 B2 | 3/2018 | Benishti et al. |
| 9,940,750 B2 | 4/2018 | Dillavou et al. |
| 9,943,374 B2 | 4/2018 | Merritt et al. |
| 9,947,110 B2 | 4/2018 | Haimerl |
| 9,952,664 B2 | 4/2018 | Border et al. |
| 9,956,054 B2 | 5/2018 | Aguirre-Valencia |
| 9,958,674 B2 | 5/2018 | Border |
| 9,959,620 B2 | 5/2018 | Merlet |
| 9,959,629 B2 | 5/2018 | Dillavou et al. |
| 9,965,681 B2 | 5/2018 | Border et al. |
| 9,968,297 B2 | 5/2018 | Connor |
| 9,980,780 B2 | 5/2018 | Lang |
| 9,986,228 B2 | 5/2018 | Woods |
| D824,523 S | 7/2018 | Paoli et al. |
| 10,010,379 B1 | 7/2018 | Gibby et al. |
| 10,013,531 B2 | 7/2018 | Richards et al. |
| 10,015,243 B2 | 7/2018 | Kazerani et al. |
| 10,016,243 B2 | 7/2018 | Esterberg |
| 10,022,064 B2 | 7/2018 | Kim et al. |
| 10,022,065 B2 | 7/2018 | Ben-Yishai et al. |
| 10,022,104 B2 | 7/2018 | Sell et al. |
| 10,023,615 B2 | 7/2018 | Bonny |
| 10,026,015 B2 | 7/2018 | Cavusoglu et al. |
| 10,034,713 B2 | 7/2018 | Yang et al. |
| 10,042,167 B2 | 8/2018 | Mcdowall et al. |
| 10,046,165 B2 | 8/2018 | Frewin et al. |
| 10,055,838 B2 | 8/2018 | Elenbaas et al. |
| 10,066,816 B2 | 9/2018 | Chang |
| 10,067,359 B1 | 9/2018 | Ushakov |
| 10,073,515 B2 | 9/2018 | Awdeh |
| 10,080,616 B2 | 9/2018 | Wilkinson et al. |
| 10,082,680 B2 | 9/2018 | Chung |
| 10,085,709 B2 | 10/2018 | Lavallee et al. |
| 10,105,187 B2 | 10/2018 | Corndorf et al. |
| 10,107,483 B2 | 10/2018 | Oren |
| 10,108,833 B2 | 10/2018 | Hong et al. |
| 10,123,840 B2 | 11/2018 | Dorman |
| 10,130,378 B2 | 11/2018 | Bryan |
| 10,132,483 B1 | 11/2018 | Feinbloom et al. |
| 10,134,166 B2 | 11/2018 | Benishti et al. |
| 10,134,194 B2 | 11/2018 | Kepner et al. |
| 10,139,652 B2 | 11/2018 | Windham |
| 10,139,920 B2 | 11/2018 | Isaacs et al. |
| 10,142,496 B1 | 11/2018 | Rao et al. |
| 10,151,928 B2 | 12/2018 | Ushakov |
| 10,154,239 B2 | 12/2018 | Casas |
| 10,159,530 B2 | 12/2018 | Lang |
| 10,163,207 B2 | 12/2018 | Merlet |
| 10,166,079 B2 | 1/2019 | Mclachlin et al. |
| 10,175,507 B2 | 1/2019 | Nakamura |
| 10,175,753 B2 | 1/2019 | Boesen |
| 10,181,361 B2 | 1/2019 | Dillavou et al. |
| 10,186,055 B2 | 1/2019 | Takahashi et al. |
| 10,188,672 B2 | 1/2019 | Wagner |
| 10,194,131 B2 | 1/2019 | Casas |
| 10,194,990 B2 | 2/2019 | Amanatullah et al. |
| 10,194,993 B2 | 2/2019 | Roger et al. |
| 10,195,076 B2 | 2/2019 | Fateh |
| 10,197,803 B2 | 2/2019 | Badiali et al. |
| 10,197,816 B2 | 2/2019 | Waisman et al. |
| 10,207,315 B2 | 2/2019 | Appleby et al. |
| 10,212,517 B1 | 2/2019 | Beltran et al. |
| 10,230,719 B2 | 3/2019 | Vaughn et al. |
| 10,231,893 B2 | 3/2019 | Lei et al. |
| 10,235,606 B2 | 3/2019 | Miao et al. |
| 10,240,769 B1 | 3/2019 | Braganca et al. |
| 10,247,965 B2 | 4/2019 | Ton |
| 10,251,724 B2 | 4/2019 | Mclachlin et al. |
| 10,261,324 B2 | 4/2019 | Chuang et al. |
| 10,262,424 B2 | 4/2019 | Ketcha et al. |
| 10,274,731 B2 | 4/2019 | Maimone |
| 10,278,777 B1 | 5/2019 | Lang |
| 10,292,768 B2 | 5/2019 | Lang |
| 10,296,805 B2 | 5/2019 | Yang et al. |
| 10,319,154 B1 | 6/2019 | Chakravarthula et al. |
| 10,326,975 B2 | 6/2019 | Casas |
| 10,332,267 B2 | 6/2019 | Rai et al. |
| 10,339,719 B2 | 7/2019 | Jagga et al. |
| 10,352,543 B1 | 7/2019 | Braganca et al. |
| 10,357,146 B2 | 7/2019 | Fiebel et al. |
| 10,357,574 B2 | 7/2019 | Hilderbrand et al. |
| 10,366,489 B2 | 7/2019 | Boettger et al. |
| 10,368,947 B2 | 8/2019 | Lang |
| 10,368,948 B2 | 8/2019 | Tripathi |
| 10,382,748 B2 | 8/2019 | Benishti et al. |
| 10,383,654 B2 | 8/2019 | Yilmaz et al. |
| 10,386,645 B2 | 8/2019 | Abou Shousha |
| 10,388,076 B2 | 8/2019 | Bar-Zeev et al. |
| 10,398,514 B2 | 9/2019 | Ryan et al. |
| 10,401,657 B2 | 9/2019 | Jiang et al. |
| 10,405,825 B2 | 9/2019 | Rai et al. |
| 10,405,927 B1 | 9/2019 | Lang |
| 10,413,752 B2 | 9/2019 | Berlinger et al. |
| 10,419,655 B2 | 9/2019 | Sivan |
| 10,420,626 B2 | 9/2019 | Tokuda et al. |
| 10,420,813 B2 | 9/2019 | Newell-Rogers et al. |
| 10,424,115 B2 | 9/2019 | Ellerbrock |
| D862,469 S | 10/2019 | Sadot et al. |
| 10,426,554 B2 | 10/2019 | Siewerdsen et al. |
| 10,429,675 B2 | 10/2019 | Greget |
| 10,431,008 B2 | 10/2019 | Djajadiningrat et al. |
| 10,433,814 B2 | 10/2019 | Razzaque et al. |
| 10,434,335 B2 | 10/2019 | Takahashi et al. |
| 10,441,236 B2 | 10/2019 | Bar-Tal et al. |
| 10,444,514 B2 | 10/2019 | Abou Shousha et al. |
| 10,447,947 B2 | 10/2019 | Liu |
| 10,448,003 B2 | 10/2019 | Grafenberg |
| 10,449,040 B2 | 10/2019 | Lashinski et al. |

(56) References Cited

U.S. PATENT DOCUMENTS

| | | |
|---|---|---|
| 10,453,187 B2 | 10/2019 | Peterson et al. |
| 10,463,434 B2 | 11/2019 | Siegler et al. |
| 10,465,892 B1 | 11/2019 | Feinbloom et al. |
| 10,466,487 B2 | 11/2019 | Blum et al. |
| 10,470,732 B2 | 11/2019 | Baumgart et al. |
| 10,473,314 B1 | 11/2019 | Braganca et al. |
| 10,485,989 B2 | 11/2019 | Jordan et al. |
| 10,488,663 B2 | 11/2019 | Choi |
| D869,772 S | 12/2019 | Gand |
| D870,977 S | 12/2019 | Berggren et al. |
| 10,492,755 B2 | 12/2019 | Lin et al. |
| 10,499,997 B2 | 12/2019 | Weinstein et al. |
| 10,502,363 B2 | 12/2019 | Edwards et al. |
| 10,504,231 B2 | 12/2019 | Fiala |
| 10,507,066 B2 | 12/2019 | Dimaio et al. |
| 10,511,822 B2 | 12/2019 | Casas |
| 10,517,544 B2 | 12/2019 | Taguchi et al. |
| 10,537,395 B2 | 1/2020 | Perez |
| 10,540,780 B1 | 1/2020 | Cousins et al. |
| 10,543,485 B2 | 1/2020 | Ismagilov et al. |
| 10,546,423 B2 | 1/2020 | Jones et al. |
| 10,548,557 B2 | 2/2020 | Lim et al. |
| 10,555,775 B2 | 2/2020 | Hoffman et al. |
| 10,568,535 B2 | 2/2020 | Roberts et al. |
| 10,571,696 B2 | 2/2020 | Urey et al. |
| 10,571,716 B2 | 2/2020 | Chapiro |
| 10,573,086 B2 | 2/2020 | Bar-Zeev et al. |
| 10,573,087 B2 | 2/2020 | Gallop et al. |
| 10,577,630 B2 | 3/2020 | Zhang et al. |
| 10,586,400 B2 | 3/2020 | Douglas |
| 10,591,737 B2 | 3/2020 | Yildiz et al. |
| 10,592,748 B1 | 3/2020 | Cousins et al. |
| 10,594,998 B1 | 3/2020 | Casas |
| 10,595,716 B2 | 3/2020 | Nazareth et al. |
| 10,601,950 B2 | 3/2020 | Devam et al. |
| 10,602,114 B2 | 3/2020 | Casas |
| 10,603,113 B2 | 3/2020 | Lang |
| 10,603,133 B2 | 3/2020 | Wang et al. |
| 10,606,085 B2 | 3/2020 | Toyama |
| 10,610,172 B2 | 4/2020 | Hummel et al. |
| 10,610,179 B2 | 4/2020 | Altmann |
| 10,613,352 B2 | 4/2020 | Knoll |
| 10,617,566 B2 | 4/2020 | Esmonde |
| 10,620,460 B2 | 4/2020 | Carabin |
| 10,621,738 B2 | 4/2020 | Miao et al. |
| 10,625,099 B2 | 4/2020 | Takahashi et al. |
| 10,626,473 B2 | 4/2020 | Mariani et al. |
| 10,631,905 B2 | 4/2020 | Asfora et al. |
| 10,631,907 B2 | 4/2020 | Zucker et al. |
| 10,634,331 B1 | 4/2020 | Feinbloom et al. |
| 10,634,921 B2 | 4/2020 | Blum et al. |
| 10,638,080 B2 | 4/2020 | Ovchinnikov et al. |
| 10,646,285 B2 | 5/2020 | Siemionow et al. |
| 10,650,513 B2 | 5/2020 | Penney et al. |
| 10,650,594 B2 | 5/2020 | Jones et al. |
| 10,652,525 B2 | 5/2020 | Woods |
| 10,653,495 B2 | 5/2020 | Gregerson et al. |
| 10,660,715 B2 | 5/2020 | Dozeman |
| 10,663,738 B2 | 5/2020 | Carlvik et al. |
| 10,665,033 B2 | 5/2020 | Bar-Zeev et al. |
| 10,670,937 B2 | 6/2020 | Alton et al. |
| 10,672,145 B2 | 6/2020 | Albiol et al. |
| 10,682,112 B2 | 6/2020 | Pizaine et al. |
| 10,682,767 B2 | 6/2020 | Grafenberg et al. |
| 10,687,901 B2 | 6/2020 | Thomas |
| 10,691,397 B1 | 6/2020 | Clements |
| 10,702,713 B2 | 7/2020 | Mori et al. |
| 10,706,540 B2 | 7/2020 | Merlet |
| 10,709,398 B2 | 7/2020 | Schweizer |
| 10,713,801 B2 | 7/2020 | Jordan et al. |
| 10,716,643 B2 | 7/2020 | Justin et al. |
| 10,722,733 B2 | 7/2020 | Takahashi |
| 10,725,535 B2 | 7/2020 | Yu |
| 10,731,832 B2 | 8/2020 | Koo |
| 10,732,721 B1 | 8/2020 | Clements |
| 10,742,949 B2 | 8/2020 | Casas |
| 10,743,939 B1 | 8/2020 | Lang |
| 10,743,943 B2 | 8/2020 | Razeto et al. |
| 10,747,315 B2 | 8/2020 | Tungare et al. |
| 10,748,319 B1 | 8/2020 | Tao et al. |
| 10,758,315 B2 | 9/2020 | Johnson et al. |
| 10,777,094 B1 | 9/2020 | Rao et al. |
| 10,777,315 B2 | 9/2020 | Zehavi et al. |
| 10,781,482 B2 | 9/2020 | Gubatayao et al. |
| 10,792,110 B2 | 10/2020 | Leung et al. |
| 10,799,145 B2 | 10/2020 | West et al. |
| 10,799,296 B2 | 10/2020 | Lang |
| 10,799,298 B2 | 10/2020 | Crawford et al. |
| 10,799,316 B2 | 10/2020 | Sela et al. |
| 10,810,799 B2 | 10/2020 | Tepper et al. |
| 10,818,019 B2 | 10/2020 | Piat et al. |
| 10,818,101 B2 | 10/2020 | Gallop et al. |
| 10,818,199 B2 | 10/2020 | Buras et al. |
| 10,825,563 B2 | 11/2020 | Gibby et al. |
| 10,827,164 B2 | 11/2020 | Perreault et al. |
| 10,831,943 B2 | 11/2020 | Santarone et al. |
| 10,835,296 B2 | 11/2020 | Elimelech et al. |
| 10,838,206 B2 | 11/2020 | Fortin-Deschnes et al. |
| 10,839,629 B2 | 11/2020 | Jones et al. |
| 10,839,956 B2 | 11/2020 | Beydoun et al. |
| 10,841,556 B2 | 11/2020 | Casas |
| 10,842,002 B2 | 11/2020 | Chang |
| 10,842,461 B2 | 11/2020 | Johnson et al. |
| 10,849,691 B2 | 12/2020 | Zucker et al. |
| 10,849,693 B2 | 12/2020 | Lang |
| 10,849,710 B2 | 12/2020 | Liu |
| 10,861,236 B2 | 12/2020 | Geri et al. |
| 10,865,220 B2 | 12/2020 | Ebetino et al. |
| 10,869,517 B1 | 12/2020 | Halpern |
| 10,869,727 B2 | 12/2020 | Yanof et al. |
| 10,872,472 B2 | 12/2020 | Watola et al. |
| 10,877,262 B1 | 12/2020 | Luxembourg |
| 10,877,296 B2 | 12/2020 | Lindsey et al. |
| 10,878,639 B2 | 12/2020 | Douglas et al. |
| 10,893,260 B2 | 1/2021 | Trail et al. |
| 10,895,742 B2 | 1/2021 | Schneider et al. |
| 10,895,743 B2 | 1/2021 | Dausmann |
| 10,895,906 B2 | 1/2021 | West et al. |
| 10,898,151 B2 | 1/2021 | Harding et al. |
| 10,908,420 B2 | 2/2021 | Lee et al. |
| 10,921,595 B2 | 2/2021 | Rakshit et al. |
| 10,921,613 B2 | 2/2021 | Gupta et al. |
| 10,928,321 B2 | 2/2021 | Rawle |
| 10,928,638 B2 | 2/2021 | Ninan et al. |
| 10,929,670 B1 | 2/2021 | Troy et al. |
| 10,935,815 B1 | 3/2021 | Cesar |
| 10,935,816 B2 | 3/2021 | Ban et al. |
| 10,936,537 B2 | 3/2021 | Huston |
| 10,939,973 B2 | 3/2021 | Dimaio et al. |
| 10,939,977 B2 | 3/2021 | Messinger et al. |
| 10,941,933 B2 | 3/2021 | Ferguson |
| 10,946,108 B2 | 3/2021 | Zhang et al. |
| 10,950,338 B2 | 3/2021 | Douglas |
| 10,951,872 B2 | 3/2021 | Casas |
| 10,964,095 B1 | 3/2021 | Douglas |
| 10,964,124 B1 | 3/2021 | Douglas |
| 10,966,768 B2 | 4/2021 | Poulos |
| 10,969,587 B2 | 4/2021 | Mcdowall et al. |
| 10,993,754 B2 | 5/2021 | Kuntz et al. |
| 11,000,335 B2 | 5/2021 | Dorman |
| 11,002,994 B2 | 5/2021 | Jiang et al. |
| 11,006,093 B1 | 5/2021 | Hegyi |
| 11,013,550 B2 | 5/2021 | Rioux et al. |
| 11,013,560 B2 | 5/2021 | Lang |
| 11,013,562 B2 | 5/2021 | Marti et al. |
| 11,013,573 B2 | 5/2021 | Chang |
| 11,013,900 B2 | 5/2021 | Malek et al. |
| 11,016,302 B2 | 5/2021 | Freeman et al. |
| 11,019,988 B2 | 6/2021 | Fiebel et al. |
| 11,027,027 B2 | 6/2021 | Manning et al. |
| 11,029,147 B2 | 6/2021 | Abovitz et al. |
| 11,030,809 B2 | 6/2021 | Wang |
| 11,041,173 B2 | 6/2021 | Zhang et al. |
| 11,045,663 B2 | 6/2021 | Mori et al. |

(56) References Cited

U.S. PATENT DOCUMENTS

| | | |
|---|---|---|
| 11,049,293 B2 | 6/2021 | Chae et al. |
| 11,049,476 B2 | 6/2021 | Fuchs et al. |
| 11,050,990 B2 | 6/2021 | Casas |
| 11,057,505 B2 | 7/2021 | Dharmatilleke |
| 11,058,390 B1 | 7/2021 | Douglas |
| 11,061,257 B1 | 7/2021 | Hakim |
| 11,064,904 B2 | 7/2021 | Kay et al. |
| 11,065,062 B2 | 7/2021 | Frushour et al. |
| 11,067,387 B2 | 7/2021 | Marell et al. |
| 11,071,497 B2 | 7/2021 | Hallack et al. |
| 11,079,596 B2 | 8/2021 | Hua et al. |
| 11,087,039 B2 | 8/2021 | Duff et al. |
| 11,090,019 B2 | 8/2021 | Siemionow et al. |
| 11,097,129 B2 | 8/2021 | Sakata et al. |
| 11,099,376 B1 | 8/2021 | Steier et al. |
| 11,103,320 B2 | 8/2021 | Leboeuf et al. |
| D930,162 S | 9/2021 | Cremer et al. |
| 11,109,762 B1 | 9/2021 | Steier et al. |
| 11,112,611 B1 | 9/2021 | Kessler et al. |
| 11,122,164 B2 | 9/2021 | Gigante |
| 11,123,604 B2 | 9/2021 | Fung |
| 11,129,562 B2 | 9/2021 | Roberts et al. |
| 11,132,055 B2 | 9/2021 | Jones et al. |
| 11,135,015 B2 | 10/2021 | Crawford et al. |
| 11,135,016 B2 | 10/2021 | Frielinghaus et al. |
| 11,137,610 B1 | 10/2021 | Kessler et al. |
| 11,141,221 B2 | 10/2021 | Hobeika et al. |
| 11,153,549 B2 | 10/2021 | Casas |
| 11,153,555 B1 | 10/2021 | Healy et al. |
| 11,163,176 B2 | 11/2021 | Karafin et al. |
| 11,164,324 B2 | 11/2021 | Liu et al. |
| 11,166,006 B2 | 11/2021 | Hegyi |
| 11,169,380 B2 | 11/2021 | Manly et al. |
| 11,172,990 B2 | 11/2021 | Lang |
| 11,179,136 B2 | 11/2021 | Kohli et al. |
| 11,180,557 B2 | 11/2021 | Noelle |
| 11,181,747 B1 | 11/2021 | Kessler et al. |
| 11,185,891 B2 | 11/2021 | Cousins et al. |
| 11,187,907 B2 | 11/2021 | Osterman et al. |
| 11,202,682 B2 | 12/2021 | Staunton et al. |
| 11,207,150 B2 | 12/2021 | Healy et al. |
| 11,217,028 B2 | 1/2022 | Jones et al. |
| 11,224,483 B2 | 1/2022 | Steinberg et al. |
| 11,224,763 B2 | 1/2022 | Takahashi et al. |
| 11,227,417 B2 | 1/2022 | Berlinger et al. |
| 11,231,787 B2 | 1/2022 | Isaacs et al. |
| 11,243,404 B2 | 2/2022 | Mcdowall et al. |
| 11,244,508 B2 | 2/2022 | Kazanzides et al. |
| 11,253,216 B2 | 2/2022 | Crawford et al. |
| 11,253,323 B2 | 2/2022 | Hughes et al. |
| 11,257,190 B2 | 2/2022 | Mao et al. |
| 11,257,241 B2 | 2/2022 | Tao |
| 11,263,772 B2 | 3/2022 | Siemionow et al. |
| 11,269,401 B2 | 3/2022 | West et al. |
| 11,272,151 B2 | 3/2022 | Casas |
| 11,278,359 B2 | 3/2022 | Siemionow et al. |
| 11,278,413 B1 | 3/2022 | Lang |
| 11,280,480 B2 | 3/2022 | Wilt et al. |
| 11,284,846 B2 | 3/2022 | Graumann et al. |
| 11,291,521 B2 | 4/2022 | Im |
| 11,294,167 B2 | 4/2022 | Ishimoda |
| 11,297,285 B2 | 4/2022 | Pierce |
| 11,300,252 B2 | 4/2022 | Nguyen |
| 11,300,790 B2 | 4/2022 | Cheng et al. |
| 11,304,621 B2 | 4/2022 | Merschon et al. |
| 11,304,759 B2 | 4/2022 | Kovtun et al. |
| 11,307,402 B2 | 4/2022 | Steier et al. |
| 11,308,663 B2 | 4/2022 | Alhrishy et al. |
| 11,311,341 B2 | 4/2022 | Lang |
| 11,317,973 B2 | 5/2022 | Calloway et al. |
| 11,337,763 B2 | 5/2022 | Choi |
| 11,348,257 B2 | 5/2022 | Lang |
| 11,350,072 B1 | 5/2022 | Quiles Casas |
| 11,350,965 B2 | 6/2022 | Yilmaz et al. |
| 11,351,006 B2 | 6/2022 | Aferzon et al. |
| 11,354,813 B2 | 6/2022 | Piat et al. |
| 11,360,315 B2 | 6/2022 | Tu et al. |
| 11,373,342 B2 | 6/2022 | Stafford et al. |
| 11,382,699 B2 | 7/2022 | Wassall et al. |
| 11,382,700 B2 | 7/2022 | Calloway et al. |
| 11,382,712 B2 | 7/2022 | Elimelech et al. |
| 11,382,713 B2 | 7/2022 | Healy et al. |
| 11,389,252 B2 | 7/2022 | Gera et al. |
| 11,393,229 B2 | 7/2022 | Zhou et al. |
| 11,399,895 B2 | 8/2022 | Soper et al. |
| 11,402,524 B2 | 8/2022 | Song et al. |
| 11,406,338 B2 | 8/2022 | Tolkowsky |
| 11,412,202 B2 | 8/2022 | Hegyi |
| 11,423,554 B2 | 8/2022 | Borsdorf et al. |
| 11,430,203 B2 | 8/2022 | Navab et al. |
| 11,432,828 B1 | 9/2022 | Lang |
| 11,432,931 B2 | 9/2022 | Lang |
| 11,443,428 B2 | 9/2022 | Petersen et al. |
| 11,443,431 B2 | 9/2022 | Flossmann et al. |
| 11,452,568 B2 | 9/2022 | Lang |
| 11,452,570 B2 | 9/2022 | Tolkowsky |
| 11,460,915 B2 | 10/2022 | Frielinghaus et al. |
| 11,461,936 B2 | 10/2022 | Freeman et al. |
| 11,461,983 B2 | 10/2022 | Jones et al. |
| 11,464,580 B2 | 10/2022 | Kemp et al. |
| 11,464,581 B2 | 10/2022 | Calloway |
| 11,475,625 B1 | 10/2022 | Douglas |
| 11,478,214 B2 | 10/2022 | Siewerdsen et al. |
| 11,483,532 B2 | 10/2022 | Quiles Casas |
| 11,488,021 B2 | 11/2022 | Sun et al. |
| 11,490,986 B2 | 11/2022 | Ben-Yishai |
| 11,510,750 B2 | 11/2022 | Dulin et al. |
| 11,513,358 B2 | 11/2022 | Mcdowall et al. |
| 11,527,002 B2 | 12/2022 | Govari |
| 11,528,393 B2 | 12/2022 | Garofolo et al. |
| 11,544,031 B2 | 1/2023 | Harviainen |
| 11,573,420 B2 | 2/2023 | Sarma et al. |
| 11,589,927 B2 | 2/2023 | Oezbek et al. |
| 11,627,924 B2 | 4/2023 | Alexandroni et al. |
| 11,644,675 B2 | 5/2023 | Manly et al. |
| 11,648,016 B2 | 5/2023 | Hathaway et al. |
| 11,651,499 B2 | 5/2023 | Wang et al. |
| 11,657,518 B2 | 5/2023 | Ketcha et al. |
| 11,666,458 B2 | 6/2023 | Kim et al. |
| 11,669,984 B2 | 6/2023 | Siewerdsen et al. |
| 11,686,947 B2 | 6/2023 | Loyola et al. |
| 11,699,236 B2 | 7/2023 | Avital et al. |
| 11,712,582 B2 | 8/2023 | Miyazaki et al. |
| 11,715,210 B2 | 8/2023 | Haslam et al. |
| 11,719,941 B2 | 8/2023 | Russell |
| 11,730,389 B2 | 8/2023 | Farshad et al. |
| 11,733,516 B2 | 8/2023 | Edwin et al. |
| 11,734,901 B2 | 8/2023 | Jones et al. |
| 11,744,657 B2 | 9/2023 | Leboeuf et al. |
| 11,750,794 B2 | 9/2023 | Benishti et al. |
| 11,766,296 B2 | 9/2023 | Wolf et al. |
| 11,798,178 B2 | 10/2023 | Merlet |
| 11,801,097 B2 | 10/2023 | Crawford et al. |
| 11,801,115 B2 | 10/2023 | Elimelech et al. |
| 11,808,943 B2 | 11/2023 | Robaina et al. |
| 11,815,683 B2 | 11/2023 | Sears et al. |
| 11,826,111 B2 | 11/2023 | Mahfouz |
| 11,832,886 B2 | 12/2023 | Dorman |
| 11,838,493 B2 | 12/2023 | Healy et al. |
| 11,839,433 B2 | 12/2023 | Schaewe et al. |
| 11,839,501 B2 | 12/2023 | Takahashi et al. |
| 11,864,934 B2 | 1/2024 | Junio et al. |
| 11,885,752 B2 | 1/2024 | St-Aubin et al. |
| 11,892,647 B2 | 2/2024 | Hung et al. |
| 11,896,445 B2 | 2/2024 | Gera et al. |
| 11,900,620 B2 | 2/2024 | Lalys et al. |
| 11,914,155 B2 | 2/2024 | Zhu et al. |
| 11,918,310 B1 | 3/2024 | Roh et al. |
| 11,922,631 B2 | 3/2024 | Haslam et al. |
| 11,941,814 B2 | 3/2024 | Crawford et al. |
| 11,944,508 B1 | 4/2024 | Cowin et al. |
| 11,948,265 B2 | 4/2024 | Gibby et al. |
| 11,950,968 B2 | 4/2024 | Wiggermann |
| 11,957,420 B2 | 4/2024 | Lang |

(56) References Cited

U.S. PATENT DOCUMENTS

| | | |
|---|---|---|
| 11,961,193 B2 | 4/2024 | Pelzl et al. |
| 11,963,723 B2 | 4/2024 | Vilsmeier et al. |
| 11,972,582 B2 | 4/2024 | Yan et al. |
| 11,974,819 B2 | 5/2024 | Finley et al. |
| 11,974,887 B2 | 5/2024 | Elimelech et al. |
| 11,977,232 B2 | 5/2024 | Wu et al. |
| 11,980,429 B2 | 5/2024 | Wolf et al. |
| 11,980,506 B2 | 5/2024 | Wolf et al. |
| 11,980,507 B2 | 5/2024 | Elimelech et al. |
| 11,980,508 B2 | 5/2024 | Elimelech et al. |
| 11,983,824 B2 | 5/2024 | Avisar et al. |
| 12,002,171 B2 | 6/2024 | Jones et al. |
| 12,010,285 B2 | 6/2024 | Quiles Casas |
| 12,014,497 B2 | 6/2024 | Hong et al. |
| 12,019,314 B1 | 6/2024 | Steines et al. |
| 12,044,856 B2 | 7/2024 | Gera et al. |
| 12,044,858 B2 | 7/2024 | Gera et al. |
| 12,063,345 B2 | 8/2024 | Benishti et al. |
| 12,069,233 B2 | 8/2024 | Benishti et al. |
| 12,076,196 B2 | 9/2024 | Elimelech et al. |
| 2002/0082498 A1 | 6/2002 | Wendt et al. |
| 2003/0059097 A1 | 3/2003 | Abovitz et al. |
| 2003/0117393 A1 | 6/2003 | Sauer et al. |
| 2003/0130576 A1 | 7/2003 | Seeley et al. |
| 2003/0156144 A1 | 8/2003 | Morita |
| 2003/0210812 A1 | 11/2003 | Khamene et al. |
| 2003/0225329 A1 | 12/2003 | Rossner et al. |
| 2004/0019263 A1 | 1/2004 | Jutras et al. |
| 2004/0030237 A1 | 2/2004 | Lee et al. |
| 2004/0138556 A1 | 7/2004 | Cosman |
| 2004/0152955 A1 | 8/2004 | McGinley et al. |
| 2004/0171930 A1 | 9/2004 | Grimm et al. |
| 2004/0238732 A1 | 12/2004 | State et al. |
| 2005/0017972 A1 | 1/2005 | Poole et al. |
| 2005/0024586 A1 | 2/2005 | Teiwes et al. |
| 2005/0119639 A1 | 6/2005 | McCombs et al. |
| 2005/0154296 A1 | 7/2005 | Lechner et al. |
| 2005/0203367 A1 | 9/2005 | Ahmed et al. |
| 2005/0203380 A1 | 9/2005 | Sauer et al. |
| 2005/0215879 A1 | 9/2005 | Chuanggui |
| 2005/0267358 A1 | 12/2005 | Tuma et al. |
| 2006/0072124 A1 | 4/2006 | Smetak et al. |
| 2006/0134198 A1 | 6/2006 | Tawa et al. |
| 2006/0147100 A1 | 7/2006 | Fitzpatrick |
| 2006/0176242 A1 | 8/2006 | Jaramaz et al. |
| 2007/0018975 A1 | 1/2007 | Chuanggui et al. |
| 2007/0058261 A1 | 3/2007 | Sugihara et al. |
| 2007/0100325 A1 | 5/2007 | Jutras et al. |
| 2007/0183041 A1 | 8/2007 | McCloy et al. |
| 2007/0233371 A1 | 10/2007 | Stoschek et al. |
| 2007/0273610 A1 | 11/2007 | Baillot |
| 2008/0002809 A1 | 1/2008 | Bodduluri |
| 2008/0007645 A1 | 1/2008 | McCutchen |
| 2008/0035266 A1 | 2/2008 | Danziger |
| 2008/0085033 A1 | 4/2008 | Haven et al. |
| 2008/0159612 A1 | 7/2008 | Fu et al. |
| 2008/0183065 A1 | 7/2008 | Goldbach |
| 2008/0221625 A1 | 9/2008 | Hufner et al. |
| 2008/0253527 A1 | 10/2008 | Boyden et al. |
| 2008/0262812 A1 | 10/2008 | Arata et al. |
| 2008/0287728 A1 | 11/2008 | Mostafavi et al. |
| 2009/0005961 A1 | 1/2009 | Grabowski et al. |
| 2009/0018437 A1 | 1/2009 | Cooke |
| 2009/0024127 A1 | 1/2009 | Lechner et al. |
| 2009/0036902 A1 | 2/2009 | Dimaio et al. |
| 2009/0062869 A1 | 3/2009 | Claverie et al. |
| 2009/0099445 A1 | 4/2009 | Burger |
| 2009/0123452 A1 | 5/2009 | Madison |
| 2009/0227847 A1 | 9/2009 | Tepper et al. |
| 2009/0285366 A1 | 11/2009 | Essenreiter et al. |
| 2009/0300540 A1 | 12/2009 | Russell |
| 2010/0076305 A1 | 3/2010 | Maier-Hein et al. |
| 2010/0094308 A1 | 4/2010 | Tatsumi et al. |
| 2010/0106010 A1 | 4/2010 | Rubner et al. |
| 2010/0114110 A1 | 5/2010 | Taft et al. |
| 2010/0138939 A1 | 6/2010 | Bentzon et al. |
| 2010/0149073 A1 | 6/2010 | Chaum et al. |
| 2010/0172567 A1 | 7/2010 | Prokoski |
| 2010/0210939 A1 | 8/2010 | Hartmann et al. |
| 2010/0266220 A1 | 10/2010 | Zagorchev et al. |
| 2010/0274124 A1 | 10/2010 | Jascob et al. |
| 2011/0004259 A1 | 1/2011 | Stallings et al. |
| 2011/0098553 A1 | 4/2011 | Robbins et al. |
| 2011/0105895 A1 | 5/2011 | Kornblau et al. |
| 2011/0216060 A1 | 9/2011 | Weising et al. |
| 2011/0245625 A1 | 10/2011 | Trovato et al. |
| 2011/0248064 A1 | 10/2011 | Marczyk |
| 2011/0254922 A1 | 10/2011 | Schaerer et al. |
| 2011/0306873 A1 | 12/2011 | Shenai et al. |
| 2012/0014608 A1 | 1/2012 | Watanabe |
| 2012/0068913 A1 | 3/2012 | Bar-Zeev et al. |
| 2012/0078236 A1 | 3/2012 | Schoepp |
| 2012/0109151 A1 | 5/2012 | Maier-Hein et al. |
| 2012/0143050 A1 | 6/2012 | Heigl |
| 2012/0155064 A1 | 6/2012 | Waters |
| 2012/0162452 A1 | 6/2012 | Liu |
| 2012/0182605 A1 | 7/2012 | Hall et al. |
| 2012/0201421 A1 | 8/2012 | Hartmann et al. |
| 2012/0216411 A1 | 8/2012 | Wevers et al. |
| 2012/0224260 A1 | 9/2012 | Healy et al. |
| 2012/0238609 A1 | 9/2012 | Srivastava et al. |
| 2012/0289777 A1 | 11/2012 | Chopra et al. |
| 2012/0306850 A1 | 12/2012 | Balan et al. |
| 2012/0320100 A1 | 12/2012 | Machida et al. |
| 2013/0002928 A1 | 1/2013 | Imai |
| 2013/0009853 A1 | 1/2013 | Hesselink et al. |
| 2013/0038632 A1 | 2/2013 | Dillavou et al. |
| 2013/0050258 A1 | 2/2013 | Liu et al. |
| 2013/0050833 A1 | 2/2013 | Lewis et al. |
| 2013/0057581 A1 | 3/2013 | Meier |
| 2013/0079829 A1 | 3/2013 | Globerman et al. |
| 2013/0083009 A1 | 4/2013 | Geisner et al. |
| 2013/0106833 A1 | 5/2013 | Fun |
| 2013/0135734 A1 | 5/2013 | Shafer et al. |
| 2013/0135738 A1 | 5/2013 | Shafer et al. |
| 2013/0190602 A1 | 7/2013 | Liao et al. |
| 2013/0195338 A1 | 8/2013 | Xu et al. |
| 2013/0209953 A1 | 8/2013 | Arlinsky et al. |
| 2013/0212453 A1 | 8/2013 | Gudai et al. |
| 2013/0234914 A1 | 9/2013 | Fujimaki |
| 2013/0234935 A1 | 9/2013 | Griffith |
| 2013/0237811 A1 | 9/2013 | Mihailescu et al. |
| 2013/0245461 A1 | 9/2013 | Maier-Hein et al. |
| 2013/0249787 A1 | 9/2013 | Morimoto |
| 2013/0249945 A1 | 9/2013 | Kobayashi |
| 2013/0265623 A1 | 10/2013 | Sugiyama et al. |
| 2013/0267838 A1 | 10/2013 | Fronk et al. |
| 2013/0278631 A1 | 10/2013 | Border et al. |
| 2013/0278635 A1 | 10/2013 | Maggiore |
| 2013/0300637 A1 | 11/2013 | Smits et al. |
| 2013/0300760 A1 | 11/2013 | Sugano et al. |
| 2013/0342571 A1 | 12/2013 | Kinnebrew et al. |
| 2014/0031668 A1 | 1/2014 | Mobasser et al. |
| 2014/0049629 A1 | 2/2014 | Siewerdsen et al. |
| 2014/0088402 A1 | 3/2014 | Xu |
| 2014/0088990 A1 | 3/2014 | Nawana et al. |
| 2014/0104505 A1 | 4/2014 | Koenig |
| 2014/0105912 A1 | 4/2014 | Noelle |
| 2014/0114173 A1 | 4/2014 | Bar-Tal et al. |
| 2014/0142426 A1 | 5/2014 | Razzaque et al. |
| 2014/0168261 A1 | 6/2014 | Margolis et al. |
| 2014/0176661 A1 | 6/2014 | Smurro et al. |
| 2014/0177023 A1 | 6/2014 | Gao et al. |
| 2014/0189508 A1 | 7/2014 | Granchi et al. |
| 2014/0198129 A1 | 7/2014 | Liu et al. |
| 2014/0218291 A1 | 8/2014 | Kirk |
| 2014/0240484 A1 | 8/2014 | Kodama et al. |
| 2014/0243614 A1 | 8/2014 | Rothberg et al. |
| 2014/0256429 A1 | 9/2014 | Kobayashi et al. |
| 2014/0266983 A1 | 9/2014 | Christensen |
| 2014/0268356 A1 | 9/2014 | Bolas et al. |
| 2014/0270505 A1 | 9/2014 | Mccarthy |
| 2014/0275760 A1 | 9/2014 | Lee et al. |
| 2014/0285404 A1 | 9/2014 | Takano et al. |

(56) References Cited

U.S. PATENT DOCUMENTS

| | | |
|---|---|---|
| 2014/0285429 A1 | 9/2014 | Simmons |
| 2014/0300632 A1 | 10/2014 | Laor |
| 2014/0300967 A1 | 10/2014 | Tilleman et al. |
| 2014/0301624 A1 | 10/2014 | Barckow et al. |
| 2014/0303491 A1 | 10/2014 | Shekhar et al. |
| 2014/0320399 A1 | 10/2014 | Kim et al. |
| 2014/0333899 A1 | 11/2014 | Smithwick |
| 2014/0336461 A1 | 11/2014 | Reiter et al. |
| 2014/0340286 A1 | 11/2014 | Machida et al. |
| 2014/0361956 A1 | 12/2014 | Mikhailov et al. |
| 2014/0371728 A1 | 12/2014 | Vaughn |
| 2015/0005772 A1 | 1/2015 | Anglin et al. |
| 2015/0018672 A1 | 1/2015 | Blumhofer et al. |
| 2015/0031985 A1 | 1/2015 | Reddy et al. |
| 2015/0043798 A1 | 2/2015 | Carrell et al. |
| 2015/0070347 A1 | 3/2015 | Hofmann et al. |
| 2015/0084990 A1 | 3/2015 | Laor |
| 2015/0150641 A1 | 6/2015 | Daon et al. |
| 2015/0182293 A1 | 7/2015 | Yang et al. |
| 2015/0192776 A1 | 7/2015 | Lee et al. |
| 2015/0209119 A1 | 7/2015 | Theodore et al. |
| 2015/0261922 A1 | 9/2015 | Nawana et al. |
| 2015/0277123 A1 | 10/2015 | Chaum et al. |
| 2015/0282735 A1 | 10/2015 | Rossner |
| 2015/0287188 A1 | 10/2015 | Gazit et al. |
| 2015/0287236 A1 | 10/2015 | Winne et al. |
| 2015/0297314 A1 | 10/2015 | Fowler et al. |
| 2015/0305828 A1 | 10/2015 | Park et al. |
| 2015/0310668 A1 | 10/2015 | Ellerbrock |
| 2015/0338652 A1 | 11/2015 | Lim et al. |
| 2015/0338653 A1 | 11/2015 | Subramaniam et al. |
| 2015/0350517 A1 | 12/2015 | Duret et al. |
| 2015/0351863 A1 | 12/2015 | Plassky et al. |
| 2015/0363978 A1 | 12/2015 | Maimone et al. |
| 2015/0366620 A1 | 12/2015 | Cameron et al. |
| 2016/0015878 A1 | 1/2016 | Graham et al. |
| 2016/0022287 A1 | 1/2016 | Nehls |
| 2016/0030131 A1 | 2/2016 | Yang et al. |
| 2016/0054571 A1 | 2/2016 | Tazbaz et al. |
| 2016/0086380 A1 | 3/2016 | Vayser et al. |
| 2016/0103318 A1 | 4/2016 | Du et al. |
| 2016/0125603 A1 | 5/2016 | Tanji |
| 2016/0133051 A1 | 5/2016 | Aonuma et al. |
| 2016/0143699 A1 | 5/2016 | Tanji |
| 2016/0153004 A1 | 6/2016 | Zhang et al. |
| 2016/0163045 A1 | 6/2016 | Penney et al. |
| 2016/0175064 A1 | 6/2016 | Steinle et al. |
| 2016/0178910 A1 | 6/2016 | Giudicelli et al. |
| 2016/0191887 A1 | 6/2016 | Casas |
| 2016/0223822 A1 | 8/2016 | Harrison et al. |
| 2016/0228033 A1 | 8/2016 | Rossner |
| 2016/0246059 A1 | 8/2016 | Halpin et al. |
| 2016/0249989 A1 | 9/2016 | Devam et al. |
| 2016/0256223 A1 | 9/2016 | Haimerl et al. |
| 2016/0275684 A1 | 9/2016 | Elenbaas et al. |
| 2016/0302870 A1 | 10/2016 | Wilkinson et al. |
| 2016/0324580 A1 | 11/2016 | Esterberg |
| 2016/0324583 A1 | 11/2016 | Kheradpir et al. |
| 2016/0339337 A1 | 11/2016 | Ellsworth et al. |
| 2017/0014119 A1 | 1/2017 | Capote et al. |
| 2017/0024634 A1 | 1/2017 | Miao et al. |
| 2017/0027650 A1 | 2/2017 | Merck et al. |
| 2017/0031163 A1 | 2/2017 | Gao et al. |
| 2017/0031179 A1 | 2/2017 | Guillot et al. |
| 2017/0045742 A1 | 2/2017 | Greenhalgh et al. |
| 2017/0065364 A1 | 3/2017 | Schuh et al. |
| 2017/0068119 A1 | 3/2017 | Antaki et al. |
| 2017/0076501 A1 | 3/2017 | Jagga et al. |
| 2017/0086941 A1 | 3/2017 | Marti et al. |
| 2017/0112586 A1 | 4/2017 | Dhupar |
| 2017/0148215 A1* | 5/2017 | Aksoy .................. G02B 27/017 |
| 2017/0164919 A1 | 6/2017 | Lavallee et al. |
| 2017/0164920 A1 | 6/2017 | Lavallee et al. |
| 2017/0178375 A1 | 6/2017 | Benishti et al. |
| 2017/0220224 A1 | 8/2017 | Kodali et al. |
| 2017/0239015 A1 | 8/2017 | Sela et al. |
| 2017/0245944 A1 | 8/2017 | Crawford et al. |
| 2017/0251900 A1 | 9/2017 | Hansen et al. |
| 2017/0252109 A1 | 9/2017 | Yang et al. |
| 2017/0258526 A1 | 9/2017 | Lang |
| 2017/0281283 A1 | 10/2017 | Siegler et al. |
| 2017/0312032 A1 | 11/2017 | Amanatullah et al. |
| 2017/0322950 A1 | 11/2017 | Han et al. |
| 2017/0348055 A1 | 12/2017 | Salcedo et al. |
| 2017/0348061 A1 | 12/2017 | Joshi et al. |
| 2017/0366773 A1 | 12/2017 | Kiraly et al. |
| 2017/0367766 A1 | 12/2017 | Mahfouz |
| 2017/0367771 A1 | 12/2017 | Tako et al. |
| 2017/0372477 A1 | 12/2017 | Penney et al. |
| 2018/0003981 A1 | 1/2018 | Urey |
| 2018/0018791 A1 | 1/2018 | Guoyi |
| 2018/0021597 A1 | 1/2018 | Berlinger et al. |
| 2018/0028266 A1 | 2/2018 | Barnes et al. |
| 2018/0036884 A1 | 2/2018 | Chen et al. |
| 2018/0049622 A1 | 2/2018 | Ryan et al. |
| 2018/0055579 A1 | 3/2018 | Daon et al. |
| 2018/0078316 A1 | 3/2018 | Schaewe et al. |
| 2018/0082480 A1 | 3/2018 | White et al. |
| 2018/0092667 A1 | 4/2018 | Heigl et al. |
| 2018/0092698 A1 | 4/2018 | Chopra et al. |
| 2018/0092699 A1 | 4/2018 | Finley |
| 2018/0116732 A1 | 5/2018 | Lin et al. |
| 2018/0116741 A1 | 5/2018 | Garcia et al. |
| 2018/0117150 A1 | 5/2018 | O'Dwyer et al. |
| 2018/0120106 A1 | 5/2018 | Sato |
| 2018/0133871 A1 | 5/2018 | Farmer |
| 2018/0143442 A1* | 5/2018 | Gupta .................. A61M 21/00 |
| 2018/0153626 A1 | 6/2018 | Yang et al. |
| 2018/0182150 A1 | 6/2018 | Benishti et al. |
| 2018/0185100 A1 | 7/2018 | Weinstein et al. |
| 2018/0185113 A1 | 7/2018 | Gregerson et al. |
| 2018/0193097 A1 | 7/2018 | Mclachlin et al. |
| 2018/0200002 A1 | 7/2018 | Kostrzewski et al. |
| 2018/0247128 A1 | 8/2018 | Alvi et al. |
| 2018/0262743 A1 | 9/2018 | Casas |
| 2018/0303558 A1 | 10/2018 | Thomas |
| 2018/0311011 A1 | 11/2018 | Van et al. |
| 2018/0317803 A1 | 11/2018 | Ben-Yishai et al. |
| 2018/0318035 A1 | 11/2018 | Mclachlin et al. |
| 2018/0368898 A1 | 12/2018 | Divincenzo et al. |
| 2019/0000372 A1 | 1/2019 | Gullotti et al. |
| 2019/0000564 A1 | 1/2019 | Navab et al. |
| 2019/0015163 A1 | 1/2019 | Abhari et al. |
| 2019/0018235 A1 | 1/2019 | Ouderkirk et al. |
| 2019/0038362 A1 | 2/2019 | Nash et al. |
| 2019/0038365 A1 | 2/2019 | Soper et al. |
| 2019/0043238 A1 | 2/2019 | Benishti et al. |
| 2019/0043392 A1 | 2/2019 | Abele |
| 2019/0046272 A1 | 2/2019 | Zoabi et al. |
| 2019/0046276 A1 | 2/2019 | Inglese et al. |
| 2019/0053851 A1 | 2/2019 | Siemionow et al. |
| 2019/0069971 A1 | 3/2019 | Tripathi et al. |
| 2019/0080515 A1 | 3/2019 | Geri et al. |
| 2019/0105116 A1 | 4/2019 | Johnson et al. |
| 2019/0130792 A1 | 5/2019 | Rios et al. |
| 2019/0142519 A1 | 5/2019 | Siemionow et al. |
| 2019/0144443 A1 | 5/2019 | Jackson et al. |
| 2019/0175228 A1 | 6/2019 | Elimelech et al. |
| 2019/0192230 A1 | 6/2019 | Siemionow et al. |
| 2019/0200894 A1 | 7/2019 | Jung et al. |
| 2019/0201106 A1 | 7/2019 | Siemionow et al. |
| 2019/0205606 A1 | 7/2019 | Zhou et al. |
| 2019/0216537 A1 | 7/2019 | Eltorai et al. |
| 2019/0251692 A1 | 8/2019 | Schmidt-Richberg et al. |
| 2019/0251694 A1 | 8/2019 | Han et al. |
| 2019/0254753 A1 | 8/2019 | Johnson et al. |
| 2019/0273916 A1 | 9/2019 | Benishti et al. |
| 2019/0310481 A1 | 10/2019 | Blum et al. |
| 2019/0333480 A1 | 10/2019 | Lang |
| 2019/0369660 A1 | 12/2019 | Wen et al. |
| 2019/0369717 A1 | 12/2019 | Frielinghaus et al. |
| 2019/0378276 A1 | 12/2019 | Flossmann et al. |
| 2019/0387351 A1 | 12/2019 | Lyren et al. |
| 2020/0015895 A1 | 1/2020 | Frielinghaus et al. |

(56) References Cited

U.S. PATENT DOCUMENTS

| | | |
|---|---|---|
| 2020/0019364 A1 | 1/2020 | Pond |
| 2020/0020249 A1 | 1/2020 | Jarc et al. |
| 2020/0038112 A1 | 2/2020 | Amanatullah et al. |
| 2020/0043160 A1 | 2/2020 | Mizukura et al. |
| 2020/0078100 A1 | 3/2020 | Weinstein et al. |
| 2020/0085511 A1 | 3/2020 | Oezbek et al. |
| 2020/0088997 A1 | 3/2020 | Lee et al. |
| 2020/0100847 A1 | 4/2020 | Siegler et al. |
| 2020/0117025 A1 | 4/2020 | Sauer |
| 2020/0129058 A1 | 4/2020 | Li et al. |
| 2020/0129136 A1 | 4/2020 | Harding et al. |
| 2020/0129262 A1 | 4/2020 | Verard et al. |
| 2020/0129264 A1 | 4/2020 | Oativia et al. |
| 2020/0133029 A1 | 4/2020 | Yonezawa |
| 2020/0138518 A1 | 5/2020 | Lang |
| 2020/0138618 A1 | 5/2020 | Roszkowiak et al. |
| 2020/0143594 A1 | 5/2020 | Lal et al. |
| 2020/0146546 A1 | 5/2020 | Chene et al. |
| 2020/0151507 A1 | 5/2020 | Siemionow et al. |
| 2020/0156259 A1 | 5/2020 | Ruiz et al. |
| 2020/0159313 A1 | 5/2020 | Gibby et al. |
| 2020/0163723 A1 | 5/2020 | Wolf et al. |
| 2020/0163739 A1 | 5/2020 | Messinger et al. |
| 2020/0178916 A1 | 6/2020 | Lalys et al. |
| 2020/0184638 A1 | 6/2020 | Meglan et al. |
| 2020/0186786 A1 | 6/2020 | Gibby et al. |
| 2020/0188028 A1 | 6/2020 | Feiner et al. |
| 2020/0188034 A1 | 6/2020 | Lequette et al. |
| 2020/0201082 A1 | 6/2020 | Carabin |
| 2020/0229877 A1 | 7/2020 | Siemionow et al. |
| 2020/0237256 A1 | 7/2020 | Farshad et al. |
| 2020/0237459 A1 | 7/2020 | Racheli et al. |
| 2020/0237880 A1 | 7/2020 | Kent et al. |
| 2020/0242280 A1 | 7/2020 | Pavloff et al. |
| 2020/0246074 A1 | 8/2020 | Lang |
| 2020/0246081 A1 | 8/2020 | Johnson et al. |
| 2020/0264451 A1 | 8/2020 | Blum et al. |
| 2020/0265273 A1 | 8/2020 | Wei et al. |
| 2020/0275988 A1 | 9/2020 | Johnson et al. |
| 2020/0281554 A1 | 9/2020 | Trini et al. |
| 2020/0286222 A1 | 9/2020 | Essenreiter et al. |
| 2020/0288075 A1 | 9/2020 | Bonin et al. |
| 2020/0294233 A1 | 9/2020 | Merlet |
| 2020/0297427 A1 | 9/2020 | Cameron et al. |
| 2020/0305980 A1 | 10/2020 | Lang |
| 2020/0315734 A1 | 10/2020 | El Amm |
| 2020/0321099 A1 | 10/2020 | Holladay et al. |
| 2020/0323460 A1 | 10/2020 | Busza et al. |
| 2020/0323609 A1 | 10/2020 | Johnson et al. |
| 2020/0327721 A1 | 10/2020 | Siemionow et al. |
| 2020/0330179 A1 | 10/2020 | Ton |
| 2020/0337780 A1 | 10/2020 | Winkler et al. |
| 2020/0341283 A1 | 10/2020 | Mccracken et al. |
| 2020/0352655 A1 | 11/2020 | Freese |
| 2020/0355927 A1 | 11/2020 | Marcellin-Dibon et al. |
| 2020/0360091 A1 | 11/2020 | Murray et al. |
| 2020/0375666 A1 | 12/2020 | Murphy |
| 2020/0377493 A1 | 12/2020 | Heiser et al. |
| 2020/0377956 A1 | 12/2020 | Vogelstein et al. |
| 2020/0388075 A1 | 12/2020 | Kazanzides et al. |
| 2020/0389425 A1 | 12/2020 | Bhatia et al. |
| 2020/0390502 A1 | 12/2020 | Holthuizen et al. |
| 2020/0390503 A1 | 12/2020 | Casas et al. |
| 2020/0402647 A1 | 12/2020 | Domracheva et al. |
| 2020/0409306 A1 | 12/2020 | Gelman et al. |
| 2020/0410687 A1 | 12/2020 | Siemionow et al. |
| 2020/0413031 A1 | 12/2020 | Khani et al. |
| 2021/0004956 A1 | 1/2021 | Book et al. |
| 2021/0009339 A1 | 1/2021 | Morrison et al. |
| 2021/0015560 A1 | 1/2021 | Boddington et al. |
| 2021/0015583 A1 | 1/2021 | Avisar et al. |
| 2021/0022599 A1 | 1/2021 | Freeman et al. |
| 2021/0022808 A1 | 1/2021 | Lang |
| 2021/0022811 A1 | 1/2021 | Mahfouz |
| 2021/0022828 A1 | 1/2021 | Elimelech et al. |
| 2021/0029804 A1 | 1/2021 | Chang |
| 2021/0030374 A1 | 2/2021 | Takahashi et al. |
| 2021/0030511 A1 | 2/2021 | Wolf et al. |
| 2021/0038339 A1 | 2/2021 | Yu et al. |
| 2021/0049825 A1 | 2/2021 | Wheelwright et al. |
| 2021/0052348 A1 | 2/2021 | Stifter et al. |
| 2021/0056687 A1 | 2/2021 | Hibbard et al. |
| 2021/0065911 A1 | 3/2021 | Goel et al. |
| 2021/0077195 A1 | 3/2021 | Saeidi et al. |
| 2021/0077210 A1 | 3/2021 | Itkowitz et al. |
| 2021/0080751 A1 | 3/2021 | Lindsey et al. |
| 2021/0090344 A1 | 3/2021 | Geri et al. |
| 2021/0093391 A1 | 4/2021 | Poltaretskyi et al. |
| 2021/0093392 A1 | 4/2021 | Poltaretskyi et al. |
| 2021/0093400 A1 | 4/2021 | Quaid et al. |
| 2021/0093417 A1 | 4/2021 | Liu |
| 2021/0104055 A1 | 4/2021 | Ni et al. |
| 2021/0107923 A1 | 4/2021 | Jackson et al. |
| 2021/0109349 A1 | 4/2021 | Schneider et al. |
| 2021/0109373 A1 | 4/2021 | Loo et al. |
| 2021/0110517 A1 | 4/2021 | Flohr et al. |
| 2021/0113269 A1 | 4/2021 | Mlsmeier et al. |
| 2021/0113293 A9 | 4/2021 | Silva et al. |
| 2021/0121238 A1 | 4/2021 | Palushi et al. |
| 2021/0137634 A1 | 5/2021 | Lang |
| 2021/0141887 A1 | 5/2021 | Kim et al. |
| 2021/0150702 A1 | 5/2021 | Claessen et al. |
| 2021/0157544 A1 | 5/2021 | Denton |
| 2021/0160472 A1 | 5/2021 | Casas |
| 2021/0161614 A1 | 6/2021 | Elimelech et al. |
| 2021/0162287 A1 | 6/2021 | Xing et al. |
| 2021/0165207 A1 | 6/2021 | Peyman |
| 2021/0169504 A1 | 6/2021 | Brown |
| 2021/0169578 A1 | 6/2021 | Calloway et al. |
| 2021/0169581 A1 | 6/2021 | Calloway et al. |
| 2021/0169605 A1 | 6/2021 | Calloway et al. |
| 2021/0186647 A1 | 6/2021 | Elimelech et al. |
| 2021/0196404 A1 | 7/2021 | Wang |
| 2021/0211640 A1 | 7/2021 | Bristol et al. |
| 2021/0223577 A1 | 7/2021 | Zhang et al. |
| 2021/0225006 A1 | 7/2021 | Grady et al. |
| 2021/0227791 A1 | 7/2021 | De et al. |
| 2021/0231301 A1 | 7/2021 | Hikmet et al. |
| 2021/0235061 A1* | 7/2021 | Hegyi .................. H04N 23/74 |
| 2021/0248822 A1 | 8/2021 | Choi et al. |
| 2021/0274281 A1 | 9/2021 | Zhang et al. |
| 2021/0278675 A1 | 9/2021 | Klug et al. |
| 2021/0282887 A1 | 9/2021 | Wiggermann |
| 2021/0290046 A1 | 9/2021 | Nazareth et al. |
| 2021/0290336 A1 | 9/2021 | Wang |
| 2021/0290394 A1 | 9/2021 | Mahfouz |
| 2021/0295108 A1 | 9/2021 | Bar |
| 2021/0295512 A1 | 9/2021 | Knoplioch et al. |
| 2021/0298795 A1 | 9/2021 | Bowling et al. |
| 2021/0298835 A1 | 9/2021 | Wang |
| 2021/0306599 A1 | 9/2021 | Pierce |
| 2021/0311322 A1 | 10/2021 | Belanger et al. |
| 2021/0314502 A1 | 10/2021 | Liu |
| 2021/0315636 A1 | 10/2021 | Akbarian et al. |
| 2021/0315662 A1 | 10/2021 | Freeman et al. |
| 2021/0325684 A1 | 10/2021 | Ninan et al. |
| 2021/0332447 A1 | 10/2021 | Lubelski et al. |
| 2021/0333561 A1 | 10/2021 | Oh et al. |
| 2021/0341739 A1 | 11/2021 | Cakmakci et al. |
| 2021/0341740 A1 | 11/2021 | Cakmakci et al. |
| 2021/0346115 A1 | 11/2021 | Dulin et al. |
| 2021/0349677 A1 | 11/2021 | Baldev et al. |
| 2021/0364802 A1 | 11/2021 | Uchiyama et al. |
| 2021/0369226 A1 | 12/2021 | Siemionow et al. |
| 2021/0371413 A1 | 12/2021 | Thurston et al. |
| 2021/0373333 A1 | 12/2021 | Moon |
| 2021/0373344 A1 | 12/2021 | Loyola et al. |
| 2021/0378757 A1 | 12/2021 | Bay et al. |
| 2021/0382310 A1 | 12/2021 | Freeman et al. |
| 2021/0386482 A1 | 12/2021 | Gera et al. |
| 2021/0389590 A1 | 12/2021 | Freeman et al. |
| 2021/0400247 A1 | 12/2021 | Casas |
| 2021/0401533 A1 | 12/2021 | Im |
| 2021/0402255 A1 | 12/2021 | Fung |

(56) References Cited

U.S. PATENT DOCUMENTS

| | | |
|---|---|---|
| 2021/0405369 A1 | 12/2021 | King |
| 2022/0003992 A1 | 1/2022 | Ahn |
| 2022/0007006 A1 | 1/2022 | Healy et al. |
| 2022/0008135 A1 | 1/2022 | Frielinghaus et al. |
| 2022/0038675 A1 | 2/2022 | Hegyi |
| 2022/0039873 A1 | 2/2022 | Harris |
| 2022/0051484 A1 | 2/2022 | Jones et al. |
| 2022/0054199 A1 | 2/2022 | Sivaprakasam et al. |
| 2022/0061921 A1 | 3/2022 | Crawford et al. |
| 2022/0071712 A1 | 3/2022 | Wolf et al. |
| 2022/0079675 A1 | 3/2022 | Lang |
| 2022/0087746 A1 | 3/2022 | Lang |
| 2022/0113810 A1 | 4/2022 | Isaacs et al. |
| 2022/0117669 A1 | 4/2022 | Nikou et al. |
| 2022/0121041 A1 | 4/2022 | Hakim |
| 2022/0133484 A1 | 5/2022 | Lang |
| 2022/0142730 A1 | 5/2022 | Wolf et al. |
| 2022/0155861 A1 | 5/2022 | Myung et al. |
| 2022/0159227 A1 | 5/2022 | Quiles Casas |
| 2022/0179209 A1 | 6/2022 | Cherukuri |
| 2022/0192776 A1 | 6/2022 | Gibby et al. |
| 2022/0193453 A1 | 6/2022 | Miyazaki et al. |
| 2022/0201274 A1 | 6/2022 | Achilefu et al. |
| 2022/0245400 A1 | 8/2022 | Siemionow et al. |
| 2022/0245821 A1 | 8/2022 | Ouzounis |
| 2022/0257206 A1 | 8/2022 | Hartley et al. |
| 2022/0269077 A1 | 8/2022 | Adema et al. |
| 2022/0270263 A1 | 8/2022 | Junio |
| 2022/0287676 A1 | 9/2022 | Steines et al. |
| 2022/0292786 A1 | 9/2022 | Pelzl et al. |
| 2022/0295033 A1 | 9/2022 | Quiles Casas |
| 2022/0296315 A1 | 9/2022 | Sokhanvar et al. |
| 2022/0304768 A1 | 9/2022 | Elimelech et al. |
| 2022/0351385 A1 | 11/2022 | Finley et al. |
| 2022/0353487 A1 | 11/2022 | Hegyi |
| 2022/0358759 A1 | 11/2022 | Cork et al. |
| 2022/0370152 A1 | 11/2022 | Lavallee et al. |
| 2022/0387130 A1 | 12/2022 | Spaas et al. |
| 2022/0392085 A1 | 12/2022 | Finley et al. |
| 2022/0397750 A1 | 12/2022 | Zhou et al. |
| 2022/0398752 A1 | 12/2022 | Yoon et al. |
| 2022/0398755 A1 | 12/2022 | Herrmann |
| 2022/0405935 A1 | 12/2022 | Flossmann et al. |
| 2023/0004013 A1 | 1/2023 | Mccracken et al. |
| 2023/0009793 A1 | 1/2023 | Gera et al. |
| 2023/0025480 A1 | 1/2023 | Kemp et al. |
| 2023/0027801 A1 | 1/2023 | Qian et al. |
| 2023/0032731 A1 | 2/2023 | Hörndler et al. |
| 2023/0034189 A1 | 2/2023 | Gera et al. |
| 2023/0050636 A1 | 2/2023 | Yanof et al. |
| 2023/0053120 A1 | 2/2023 | Jamali et al. |
| 2023/0073041 A1 | 3/2023 | Samadani et al. |
| 2023/0085387 A1 | 3/2023 | Jones et al. |
| 2023/0087783 A1 | 3/2023 | Dulin et al. |
| 2023/0100078 A1 | 3/2023 | Toporek et al. |
| 2023/0123621 A1 | 4/2023 | Joshi et al. |
| 2023/0126207 A1 | 4/2023 | Wang |
| 2023/0129056 A1 | 4/2023 | Hemingway et al. |
| 2023/0131515 A1 | 4/2023 | Oezbek et al. |
| 2023/0149083 A1 | 5/2023 | Lin et al. |
| 2023/0162493 A1 | 5/2023 | Worrell et al. |
| 2023/0165640 A1 | 6/2023 | Dulin et al. |
| 2023/0169659 A1 | 6/2023 | Chen et al. |
| 2023/0196582 A1 | 6/2023 | Grady et al. |
| 2023/0200917 A1 | 6/2023 | Calloway et al. |
| 2023/0236426 A1 | 7/2023 | Manly et al. |
| 2023/0236427 A1 | 7/2023 | Jiannyuh |
| 2023/0260142 A1 | 8/2023 | Chatterjee et al. |
| 2023/0290037 A1 | 9/2023 | Tasse et al. |
| 2023/0295302 A1 | 9/2023 | Bhagavatheeswaran et al. |
| 2023/0306590 A1 | 9/2023 | Jazdzyk et al. |
| 2023/0316550 A1 | 10/2023 | Hiasa |
| 2023/0326011 A1 | 10/2023 | Cutforth et al. |
| 2023/0326027 A1 | 10/2023 | Wahrenberg |
| 2023/0329799 A1 | 10/2023 | Gera et al. |
| 2023/0329801 A1 | 10/2023 | Elimelech et al. |
| 2023/0334664 A1 | 10/2023 | Lu et al. |
| 2023/0335261 A1 | 10/2023 | Reicher et al. |
| 2023/0359043 A1 | 11/2023 | Russell |
| 2023/0363832 A1 | 11/2023 | Mosadegh et al. |
| 2023/0371984 A1 | 11/2023 | Leuthardt et al. |
| 2023/0372053 A1 | 11/2023 | Elimelech et al. |
| 2023/0372054 A1 | 11/2023 | Elimelech et al. |
| 2023/0377171 A1 | 11/2023 | Hasler et al. |
| 2023/0377175 A1 | 11/2023 | Seok |
| 2023/0379448 A1 | 11/2023 | Benishti et al. |
| 2023/0379449 A1 | 11/2023 | Benishti et al. |
| 2023/0386022 A1 | 11/2023 | Tan et al. |
| 2023/0386067 A1 | 11/2023 | De et al. |
| 2023/0386153 A1 | 11/2023 | Rybnikov et al. |
| 2023/0394791 A1 | 12/2023 | Wang et al. |
| 2023/0397349 A1 | 12/2023 | Capelli et al. |
| 2023/0397957 A1 | 12/2023 | Crawford et al. |
| 2023/0410445 A1 | 12/2023 | Elimelech et al. |
| 2023/0419496 A1 | 12/2023 | Wuelker et al. |
| 2023/0420114 A1 | 12/2023 | Scholler et al. |
| 2024/0008935 A1 | 1/2024 | Wolf et al. |
| 2024/0016549 A1 | 1/2024 | Johnson et al. |
| 2024/0016572 A1 | 1/2024 | Elimelech et al. |
| 2024/0020831 A1 | 1/2024 | Johnson et al. |
| 2024/0020840 A1 | 1/2024 | Johnson et al. |
| 2024/0020862 A1 | 1/2024 | Johnson et al. |
| 2024/0022704 A1 | 1/2024 | Benishti et al. |
| 2024/0023946 A1 | 1/2024 | Wolf et al. |
| 2024/0041530 A1 | 2/2024 | Lang |
| 2024/0041558 A1 | 2/2024 | Siewerdsen et al. |
| 2024/0045491 A1 | 2/2024 | Sourov |
| 2024/0058064 A1 | 2/2024 | Weiser et al. |
| 2024/0062387 A1 | 2/2024 | Frantz et al. |
| 2024/0103271 A1 | 3/2024 | Zare Seisan |
| 2024/0103282 A1 | 3/2024 | Law et al. |
| 2024/0111163 A1 | 4/2024 | Law et al. |
| 2024/0122560 A1 | 4/2024 | Junio et al. |
| 2024/0126087 A1 | 4/2024 | Gera et al. |
| 2024/0127559 A1 | 4/2024 | Rybnikov et al. |
| 2024/0127578 A1 | 4/2024 | Hiasa |
| 2024/0129451 A1 | 4/2024 | Healy et al. |
| 2024/0130826 A1 | 4/2024 | Elimelech et al. |
| 2024/0134206 A1 | 4/2024 | Gera et al. |
| 2024/0144497 A1 | 5/2024 | Cvetko et al. |
| 2024/0156532 A1 | 5/2024 | Weiman et al. |
| 2024/0177445 A1 | 5/2024 | Galeotti et al. |
| 2024/0177458 A1 | 5/2024 | Zhang et al. |
| 2024/0180634 A1 | 6/2024 | Mikus |
| 2024/0185509 A1 | 6/2024 | Kovler et al. |
| 2024/0202926 A1 | 6/2024 | Crawford et al. |
| 2024/0202927 A1 | 6/2024 | Haslam et al. |
| 2024/0212111 A1 | 6/2024 | Genghi et al. |
| 2024/0261058 A1 | 8/2024 | Gera et al. |
| 2024/0307101 A1 | 9/2024 | Gera et al. |
| 2024/0404180 A1* | 12/2024 | Kobayashi ............ G06T 15/205 |

FOREIGN PATENT DOCUMENTS

| | | | |
|---|---|---|---|
| CN | 101379412 A | | 3/2009 |
| CN | 103106348 A | | 5/2013 |
| CN | 111915696 A | | 11/2020 |
| CN | 112489047 A | | 3/2021 |
| DE | 202004011567 U1 | | 11/2004 |
| DE | 102004011567 A1 | | 9/2005 |
| DE | 102014008153 A1 | | 10/2014 |
| DE | 202022103168 U1 | | 6/2022 |
| EP | 0933096 A2 | | 8/1999 |
| EP | 1640750 A2 | | 3/2006 |
| EP | 1757974 A1 | | 2/2007 |
| EP | 2119397 A1 | | 11/2009 |
| EP | 2134847 A2 | | 12/2009 |
| EP | 2557998 A1 | | 2/2013 |
| EP | 2823463 A1 | | 1/2015 |
| EP | 2868277 A1 | | 5/2015 |
| EP | 2891966 A1 | | 7/2015 |
| EP | 2963616 A2 | | 1/2016 |
| EP | 3028258 A1 | | 6/2016 |
| EP | 3034607 A1 | | 6/2016 |

(56) References Cited

FOREIGN PATENT DOCUMENTS

| | | |
|---|---|---|
| EP | 3037038 A1 | 6/2016 |
| EP | 3069318 A1 | 9/2016 |
| EP | 3076660 A1 | 10/2016 |
| EP | 3121789 A1 | 1/2017 |
| EP | 3123970 A1 | 2/2017 |
| EP | 2654749 B1 | 5/2017 |
| EP | 3175815 A1 | 6/2017 |
| EP | 3216416 A1 | 9/2017 |
| EP | 2032039 B1 | 10/2017 |
| EP | 3224376 A1 | 10/2017 |
| EP | 3247297 A1 | 11/2017 |
| EP | 3256213 A1 | 12/2017 |
| EP | 3306567 A1 | 4/2018 |
| EP | 3320874 A1 | 5/2018 |
| EP | 2030193 B1 | 7/2018 |
| EP | 2225723 B1 | 2/2019 |
| EP | 2619622 B1 | 2/2019 |
| EP | 2892558 B1 | 4/2019 |
| EP | 3494903 A1 | 6/2019 |
| EP | 2635299 B1 | 7/2019 |
| EP | 3505050 A1 | 7/2019 |
| EP | 2875149 B1 | 12/2019 |
| EP | 3593227 A1 | 1/2020 |
| EP | 3634294 A1 | 4/2020 |
| EP | 3206583 B1 | 9/2020 |
| EP | 3711700 A1 | 9/2020 |
| EP | 2625845 B1 | 3/2021 |
| EP | 3789965 A1 | 3/2021 |
| EP | 3858280 A1 | 8/2021 |
| EP | 3913423 A1 | 11/2021 |
| EP | 3952331 A1 | 2/2022 |
| EP | 3960235 A1 | 3/2022 |
| EP | 3635683 B1 | 7/2022 |
| EP | 3602492 B1 | 11/2022 |
| EP | 4173590 A1 | 5/2023 |
| EP | 3533031 B1 | 8/2023 |
| EP | 4252695 A1 | 10/2023 |
| EP | 3195257 B1 | 11/2023 |
| EP | 3405909 B1 | 11/2023 |
| EP | 4270313 A1 | 11/2023 |
| EP | 4287120 A1 | 12/2023 |
| EP | 3488381 B1 | 2/2024 |
| EP | 3834768 B1 | 2/2024 |
| EP | 3903714 B1 | 2/2024 |
| EP | 4336450 A1 | 3/2024 |
| EP | 3814984 B1 | 4/2024 |
| EP | 4115389 B1 | 4/2024 |
| EP | 3752981 B1 | 5/2024 |
| EP | 4375948 A1 | 5/2024 |
| EP | 4383203 A1 | 6/2024 |
| GB | 2507314 A | 4/2014 |
| IL | 262864 A | 3/2019 |
| JP | 2004-237092 A | 8/2004 |
| JP | 2008-507361 A | 3/2008 |
| JP | 2009-514571 A | 4/2009 |
| JP | 2021-525186 A | 9/2021 |
| KR | 10-2014-0120155 A | 10/2014 |
| WO | 03/34705 A2 | 4/2003 |
| WO | 2006/002559 A1 | 1/2006 |
| WO | 2007/051304 A1 | 5/2007 |
| WO | 2007/115826 A2 | 10/2007 |
| WO | 2008/103383 A1 | 8/2008 |
| WO | 2010/067267 A1 | 6/2010 |
| WO | 2010/074747 A1 | 7/2010 |
| WO | 2012/061537 A2 | 5/2012 |
| WO | 2012/101286 A1 | 8/2012 |
| WO | 2013/112554 A1 | 8/2013 |
| WO | 2014/014498 A1 | 1/2014 |
| WO | 2014/024188 A1 | 2/2014 |
| WO | 2014/037953 A2 | 3/2014 |
| WO | 2014/113455 A1 | 7/2014 |
| WO | 2014/125789 A1 | 8/2014 |
| WO | 2014/167563 A1 | 10/2014 |
| WO | 2014/174067 A1 | 10/2014 |
| WO | 2015/058816 A1 | 4/2015 |
| WO | 2015/061752 A1 | 4/2015 |
| WO | 2015/109145 A1 | 7/2015 |
| WO | 2016/151506 A1 | 9/2016 |
| WO | 2018/052966 A1 | 3/2018 |
| WO | 2018/073452 A1 | 4/2018 |
| WO | 2018/200767 A1 | 11/2018 |
| WO | 2018/206086 A1 | 11/2018 |
| WO | 2019/083431 A1 | 5/2019 |
| WO | 2019/135209 A1 | 7/2019 |
| WO | 2019/161477 A1 | 8/2019 |
| WO | 2019/195926 A1 | 10/2019 |
| WO | 2019/210353 A1 | 11/2019 |
| WO | 2019/211741 A1 | 11/2019 |
| WO | 2020/109903 A1 | 6/2020 |
| WO | 2020/109904 A1 | 6/2020 |
| WO | 2021/017019 A1 | 2/2021 |
| WO | 2021/019369 A1 | 2/2021 |
| WO | 2021/021979 A2 | 2/2021 |
| WO | 2021/023574 A1 | 2/2021 |
| WO | 2021/046455 A1 | 3/2021 |
| WO | 2021/048158 A1 | 3/2021 |
| WO | 2021/061459 A1 | 4/2021 |
| WO | 2021/062375 A1 | 4/2021 |
| WO | 2021/073743 A1 | 4/2021 |
| WO | 2021/087439 A1 | 5/2021 |
| WO | 2021/091980 A1 | 5/2021 |
| WO | 2021/112918 A1 | 6/2021 |
| WO | 2021/130564 A1 | 7/2021 |
| WO | 2021/137752 A1 | 7/2021 |
| WO | 2021/141887 A1 | 7/2021 |
| WO | 2021/145584 A1 | 7/2021 |
| WO | 2021/154076 A1 | 8/2021 |
| WO | 2021/183318 A2 | 9/2021 |
| WO | 2021/188757 A1 | 9/2021 |
| WO | 2021/255627 A1 | 12/2021 |
| WO | 2021/257897 A1 | 12/2021 |
| WO | 2021/258078 A1 | 12/2021 |
| WO | 2022/009233 A1 | 1/2022 |
| WO | 2022/053923 A1 | 3/2022 |
| WO | 2022/079565 A1 | 4/2022 |
| WO | 2023/003952 A1 | 1/2023 |
| WO | 2023/281395 A1 | 1/2023 |
| WO | 2023/007418 A1 | 2/2023 |
| WO | 2023/011924 A1 | 2/2023 |
| WO | 2023/021448 A1 | 2/2023 |
| WO | 2023/021450 A1 | 2/2023 |
| WO | 2023/021451 A1 | 2/2023 |
| WO | 2023/026229 A1 | 3/2023 |
| WO | 2023/047355 A1 | 3/2023 |
| WO | 2023/072887 A1 | 5/2023 |
| WO | 2023/088986 A1 | 5/2023 |
| WO | 2023/158878 A1 | 8/2023 |
| WO | 2023/159104 A2 | 8/2023 |
| WO | 2023/161848 A1 | 8/2023 |
| WO | 2023/163933 A1 | 8/2023 |
| WO | 2023/175244 A1 | 9/2023 |
| WO | 2023/186996 A1 | 10/2023 |
| WO | 2023/202909 A1 | 10/2023 |
| WO | 2023/205212 A1 | 10/2023 |
| WO | 2023/205896 A1 | 11/2023 |
| WO | 2023/209014 A1 | 11/2023 |
| WO | 2023/229415 A1 | 11/2023 |
| WO | 2023/232492 A1 | 12/2023 |
| WO | 2023/240912 A1 | 12/2023 |
| WO | 2024/001140 A1 | 1/2024 |
| WO | 2024/002620 A1 | 1/2024 |
| WO | 2024/013642 A2 | 1/2024 |
| WO | 2024/018368 A2 | 1/2024 |
| WO | 2024/046760 A1 | 3/2024 |
| WO | 2024/052136 A1 | 3/2024 |
| WO | 2024/077077 A1 | 4/2024 |
| WO | 2024/121060 A1 | 6/2024 |
| WO | 2024/132609 A1 | 6/2024 |

OTHER PUBLICATIONS

U.S. Appl. No. 16/159,740, U.S. Pat. No. 10,382,748, filed Oct. 15, 2018 Aug. 13, 2019, Combining Video-Based and Optic-Based

(56) References Cited

OTHER PUBLICATIONS

Augmented Reality in a Near Eye Display.
U.S. Appl. No. 16/419,023, U.S. Pat. No. 11,750,794, filed May 22, 2019 Sep. 5, 2023, Combining Video-Based and Optic-Based Augmented Reality in a Near Eye Display.
U.S. Appl. No. 18/352,158, filed Jul. 13, 2023, Combining Video-Based and Optic-Based Augmented Reality in a Near Eye Display.
U.S. Appl. No. 18/365,643, U.S. Pat. No. 12,069,233, filed Aug. 4, 2023, Head-Mounted Augmented Reality Near Eye Display Device.
U.S. Appl. No. 18/365,650, U.S. Pat. No. 12,063,345, filed Aug. 4, 2023, Systems for Facilitating Augmented Reality-Assisted Medical Procedures.
U.S. Appl. No. 15/127,423, U.S. Pat. No. 9,928,629, filed Sep. 20, 2016 Mar. 27, 2018, Combining Video-Based and Optic-Based Augmented Reality in a Near Eye Display.
U.S. Appl. No. 16/120,480, U.S. Pat. No. 10,835,296, filed Sep. 4, 2018 Nov. 17, 2022, Spinous Process Clamp.
U.S. Appl. No. 17/067,831, filed Oct. 12, 2020, Spinous Process Clamp.
U.S. Appl. No. 18/030,072, filed Apr. 4, 2023, Spinous Process Clamp.
U.S. Appl. No. 18/365,590, U.S. Pat. No. 11,980,508, filed Aug. 4, 2023 May 14, 2024, Registration of a Fiducial Marker for an Augmented Reality System.
U.S. Appl. No. 18/365,571, U.S. Pat. No. 11,974,887, filed Aug. 4, 2023 May 7, 2024, Registration Marker for an Augmented Reality System.
U.S. Appl. No. 18/632,588, filed Apr. 11, 2024, Registration of a Fiducial Marker for an Augmented Reality System.
U.S. Appl. No. 17/045,766 U.S. Pat. No. 11,980,507, filed Oct. 7, 2020, Registration of a Fiducial Marker for an Augmented Reality System.
U.S. Appl. No. 16/199,281, U.S. Pat. No. 10,939,977, filed Nov. 26, 2018 Mar. 9, 2021, Positioning Marker.
U.S. Appl. No. 16/524,258 U.S. Pat. No. 11,980,506, filed Jul. 29, 2019 May 14, 2024, Fiducial Marker.
U.S. Appl. No. 18/631,804, filed Apr. 10, 2024, Fiducial Marker.
U.S. Appl. No. 17/585,629, filed Jan. 27, 2022, Fiducial Marker.
U.S. Appl. No. 16/724,297 U.S. Pat. No. 11,382,712, filed Dec. 22, 2019 Jul. 12, 2022, Mirroring in Image Guided Surgery.
U.S. Appl. No. 17/827,710 U.S. Pat. No. 11,801,115, filed May 29, 2022 Oct. 31, 2023, Mirroring in Image Guided Surgery.
U.S. Appl. No. 18/352,181, filed Jul. 13, 2023, Mirroring in Image Guided Surgery.
U.S. Appl. No. 18/400,739, filed Dec. 29, 2023, Mirroring in Image Guided Surgery.
U.S. Appl. No. 18/780,095, filed Jul. 22, 2024, Mirroring in Image Guided Surgery.
U.S. Appl. No. 16/200,144 U.S. Pat. No. 11,766,296, filed Nov. 26, 2018 Sep. 26, 2023, Tracking System for Image-Guided Surgery.
U.S. Appl. No. 18/470,809 U.S. Pat. No. 11,980,429, filed Sep. 20, 2023 May 14, 2024, Tracking Methods for Image-Guided Surgery.
U.S. Appl. No. 18/631,877, filed Apr. 10, 2024, Tracking Systems and Methods for Image-Guided Surgery.
U.S. Appl. No. 17/015,199, filed Sep. 9, 2020, Universal Tool Adapter.
U.S. Appl. No. 18/598,965, filed Mar. 7, 2024, Universal Tool Adapter for Image Guided Surgery.
U.S. Appl. No. 18/044,380, filed Mar. 8, 2023, Universal Tool Adapter for Image-Guided Surgery.
U.S. Appl. No. 16/901,026 U.S. Pat. No. 11,389,252, filed Jun. 15, 2020 Jul. 19, 2022, Rotating Marker for Image Guided Surgery.
U.S. Appl. No. 18/008,980, filed Dec. 8, 2022, Rotating Marker.
U.S. Appl. No. 17/368,859 U.S. Pat. No. 11,896,445, filed Jul. 7, 2021 Feb. 13, 2024, Iliac Pin and Adapter.
U.S. Appl. No. 18/437,898, filed Feb. 9, 2024, Iliac Pin and Adapter.
U.S. Appl. No. 18/576,516, filed Jan. 4, 2024, Iliac Pin and Adapter.
U.S. Appl. No. 17/388,064, filed Jul. 29, 2021, Rotating Marker and Adapter for Image-Guided Surgery.
U.S. Appl. No. 18/291,731, filed Jan. 24, 2024, Rotating Marker and Adapter for Image-Guided Surgery.
U.S. Appl. No. 18/365,844, filed Aug. 4, 2023, Augmented-Reality Surgical System Using Depth Sensing.
U.S. Appl. No. 18/683,680, filed Feb. 14, 2024, Augmented Reality Assistance for Osteotomy and Discectomy.
U.S. Appl. No. 18/684,756, filed Feb. 19, 2024, Registration and Registration Validation in Image-Guided Surgery.
U.S. Appl. No. 18/693,338, filed Mar. 19, 2024, Surgical Planning and Display.
U.S. Appl. No. 18/365,566, filed Aug. 4, 2023, Systems for Medical Image Visualization.
U.S. Appl. No. 18/399,253, filed Dec. 28, 2023, Methods for Medical Image Visualization.
U.S. Appl. No. 18/398,837 U.S. Pat. No. 12,044,858, filed Dec. 28, 2023 Jul. 23, 2024, Adjustable Augmented Reality Eyewear for Image-Guided Medical Intervention.
U.S. Appl. No. 18/399,433 U.S. Pat. No. 12,044,856, filed Dec. 28, 2023 Jul. 23, 2024, Configurable Augmented Reality Eyewear for Image-Guided Medical Intervention.
U.S. Appl. No. 18/772,578, filed Jul. 15, 2024, Augmented Reality Eyewear for Image-Guided Medical Intervention.
U.S. Appl. No. 35/508,942 U.S. Pat. No. D 930162, filed Feb. 13, 2020 Sep. 7, 2021, Medical Headset.
16 Augmented Reality Glasses of 2021 (with Features), in Back to News, Dated May 6, 2022, accessed at https://web.archive.org/web/20221127195438/https://circuitstream.com/blog/16-augmented-reality-glasses-of-2021-with-features- breakdowns/.
Everysight, Installing your RX Adaptor, accessed Mar. 13, 2024 at https://support.everysight.com/hc/en-us/articles/115000984571-Installing-your-RX-Adaptor.
Everysight, Raptor User Manual, copyright 2017, in 46 pages.
Frames Direct, InSpatialRx Prescription Insert, Prescription Insert for Magic Leap 1, accessed Mar. 8, 2024 at https://www.framesdirect.com/inspatialrx-prescription-insert. html.
Reddit, Notice on Prescription Lenses for Nreal Glasses, accessed Mar. 13, 2024 at https://www.reddit.com/r/nreal/comments/x1fte5/notice_on_prescription_lenses_for_nreal_glasses/.
Vuzix Blades, Prescription Lens Installation Guide, copyright 2020.

* cited by examiner

STEREOSCOPIC DISPLAY AND DIGITAL LOUPE FOR AUGMENTED-REALITY NEAR-EYE DISPLAY

INCORPORATION BY REFERENCE TO ANY PRIORITY APPLICATIONS

This application claims the benefit of U.S. Provisional Patent Application No. 63/234,272, filed Aug. 18, 2021; U.S. Provisional Patent Application No. 63/236,241, filed Aug. 24, 2021; U.S. Provisional Patent Application No. 63/281,677, filed Nov. 21, 2021; and U.S. Provisional Patent Application No. 63/236,244, filed Aug. 24, 2021; the entire content of each of which is incorporated herein by reference.

FIELD

The present disclosure relates generally to augmented reality, and specifically to systems and methods for use of augmented-reality near-eye displays in image-guided surgery.

BACKGROUND

Medical practitioners use optical loupes to see a magnified image of a region of interest (ROI) during surgery and in other medical procedures. Traditionally, such optical loupes comprise magnifying optics, with fixed or variable magnification. A loupe may be, for example, integrated in a spectacle lens or may be movably mounted on a spectacle frame or on the user's head.

Near-eye display devices and systems can be used in augmented reality systems.

See-through displays (e.g., displays including at least a portion which is see-through) are used in augmented reality systems, for example for performing image-guided and/or computer-assisted surgery. Applicant's own work has demonstrated that such see-through displays can be presented as near-eye displays, e.g., integrated in a Head Mounted Device (HMD). In this way, a computer-generated image may be presented to a healthcare professional who is performing the procedure, and, in some cases, such that the image is aligned with an anatomical portion of a patient who is undergoing the procedure. Systems for image-guided surgery are described, for example, in U.S. Pat. Nos. 9,928,629, 10,835,296, 10,939,977, PCT International Publication WO 2019/211741, U.S. Patent Application Publication 2020/0163723, and PCT International Publication WO 2022/053923. The disclosures of all these patents and publications are incorporated herein by reference.

SUMMARY

Embodiments of the present disclosure provide systems and methods for presenting augmented-reality near-eye displays. The systems and methods of the disclosure each have several innovative aspects, no single one of which is solely responsible for the desirable attributes disclosed herein.

In accordance with several embodiments, a head-mounted display device (HMD) includes a see-through display, a plurality of video cameras configured to simultaneously capture an image including a region of interest (ROI) within a predefined field of view (FOV), and a distance sensor configured to measure the distance from the HMD to the ROI. The head-mounted display device also includes at least one processor configured to determine the distance from each of the video cameras to the ROI based on the measured distance from the HMD to the ROI, and adjust the display of each image of the images captured by the video cameras on the see-through display based on the determined distances from the video cameras to provide an improved display on the see-through display.

In some embodiments, the plurality of video cameras includes two video cameras positioned symmetrically about a longitudinal plane of a wearer of the head-mounted unit such that the plurality of video cameras include a left video camera and a right video camera. Each of the left and right video cameras may include a sensor.

In some embodiments, the FOV is predefined for each of the left and right video cameras by determining a crop region on each sensor. In some embodiments, the crop regions of the sensors of the left and right video cameras are determined such that the left and right video cameras converge at a preselected distance from the HMD. In some embodiments, the crop regions of the sensors of the left and right video cameras are determined such that images captured by the left and right video cameras at a preselected distance from the HMD fully overlap.

In some embodiments, the distance sensor includes an infrared camera.

In some embodiments, the left and right video cameras each include a red-green-blue (RGB) video camera.

In some embodiments, the HMD is in the form of eyewear (e.g., goggles, glasses, visor).

In some embodiments, the HMD is in the form of a helmet or over-the-head mounted device.

In some embodiments, the at least one processor is further configured to discard non-overlapping portions of the images. In some embodiments, the at least one processor is further configured to display only the overlapping portions of the images on the see-through display.

In some embodiments, the at least one processor is further configured to determine focus values corresponding to the determined distances and, for each determined distance, apply the corresponding focus value to the left and right video cameras.

In some embodiments, the at least one processor is further configured to determine a magnification value and to magnify the displayed images on the see-through display by the magnification value.

In some embodiments, the at least one processor is further configured to overlay augmented reality images on the magnified images displayed on the see-through display. The at least one processor may be further configured to magnify the overlaid augmented reality images on the see-through display by the magnification value.

In some embodiments, the augmented reality images include a 3D model of a portion of an anatomy of a patient generated from one or more pre-operative or intraoperative medical images of the portion of the anatomy of the patient (e.g., a portion of a spine of the patient, a portion of a knee of the patient, a portion of a leg or arm of the patient, a portion of a brane or cranium of the patient, a portion of a torso of the patient, a portion of a hip of the patient, a portion of a foot of the patient).

In some embodiments, the adjustment is a horizontal shift based on a horizontal shift value corresponding to the determined distances of the plurality of video cameras from the ROI.

In some embodiments, the left and right video cameras are disposed on a plane substantially parallel to a coronal plane and are positioned symmetrically with respect to a longitudinal plane. The coronal plane and the longitudinal plane may be defined with respect to a user wearing the HMD.

In some embodiments, the at least one processor is configured to determine horizontal shift values corresponding to the determined distance from the left video camera and from the right video camera to the ROI, and horizontally shift the display of each image of the images captured by the left and right video cameras on the see-through display by the corresponding horizontal shift value.

In some embodiments, the see-through display includes a left see through display and a right see-through display that are together configured to provide a stereoscopic display.

In accordance with several embodiments, a method of providing an improved stereoscopic display on a see-through display of a head-mounted display device includes simultaneously capturing images on a left and a right video camera of the head-mounted display device. The images include a region of interest (ROI) within a field of view (FOV), such as a predefined FOV. The method further includes measuring a distance from the HMD to the ROI using a distance sensor mounted on or in the head-mounted display device. The method also includes determining a distance from each of the left and right video cameras to the ROI based on the measured distance from the HMD to the ROI. The method further includes adjusting the display of each image of the images captured by the left and right video cameras on the see-through display of the head-mounted display device based on the determined distances from the left and right video cameras to provide the improved stereoscopic display on the see-through display.

The see-through display may include a left see-through display and a right see-through display. Each of the left and right video cameras may include a sensor. In some embodiments, the FOV is predefined for each of the left and right video cameras by determining a crop region on each sensor. In some embodiments, the crop regions of the sensors of the left and right video cameras are determined such that the left and right video cameras converge at a preselected distance from the HMD. In some embodiments, the crop regions of the sensors of the left and right video cameras are determined such that the images captured by the left and right video cameras at a preselected distance from the HMD fully overlap.

The distance sensor may include an infrared camera. The distance sensor may include a light source. The left and right video cameras may be red-green-blue (RGB) color video cameras.

The method may also include discarding overlapping portions of the images. The method may include displaying only the overlapping portions of the images on the see-through display.

In some embodiments, the method includes determining focus values corresponding to the determined distances and, for each determined distance, applying the corresponding focus value to the left and right video cameras.

In some embodiments, the method includes determining a magnification value and magnifying the displayed images on the see-through display by the magnification value.

In some embodiments, the method includes overlaying augmented reality images on the magnified images displayed on the see-through display. The method may also include magnifying the overlaid augmented reality images on the see-through display by the magnification value.

In some embodiments, the adjusting includes applying a horizontal shift based on a horizontal shift value corresponding to the determined distances of the left and right video cameras from the ROI.

The methods may be performed by one or more processors within the head-mounted display device or communicatively coupled to the head-mounted display device.

In accordance with several embodiments, an imaging apparatus for facilitating a medical procedure, such as a spinal surgery, includes a head-mounted unit including a see-through display and at least one video camera, which is configured to capture images of a field of view (FOV), having a first angular extent, that is viewed through the display by a user wearing the head-mounted unit and a processor configured to process the captured images so as to generate and present on the see-through display a magnified image of a region of interest (ROI) having a second angular extent within the FOV that is less than the first angular extent.

In some embodiments, the head-mounted unit comprises an eye tracker configured to identify a location of a pupil of an eye of the user wearing the head-mounted unit. In some embodiments, the processor is configured to generate the magnified image responsively to the location of the pupil. In some embodiments, the eye tracker is configured to identify respective locations of pupils of both a left eye and a right eye of the user. In some embodiments, the processor may be configured to measure an interpupillary distance responsively to the identified locations of the pupils via the eye tracker and to present respective left and right magnified images of the ROI on the see-through display responsively to the interpupillary distance.

In some embodiments, the magnified image presented by the processor comprises a stereoscopic image of the ROI. The at least one video camera may include left and right video cameras, which are mounted respectively in proximity to left and right eyes of the user. The processor may be configured to generate the stereoscopic image based on the images captured by both the left and right video cameras.

In some embodiments, the processor is configured to estimate a distance from the head-mounted unit to the ROI based on a disparity between the images captured by both the left and right video cameras, and to adjust the stereoscopic image responsively to the disparity.

In some embodiments, the see-through display includes left and right near-eye displays. The processor may be configured to generate the stereoscopic image by presenting respective left and right magnified images of the ROI on the left and right near-eye displays, while applying a horizontal shift to the left and right magnified images based on a distance from the head-mounted unit to the ROI.

In some embodiments, the head-mounted unit includes a tracking system configured to measure the distance from the head-mounted unit to the ROI. In some embodiments, the tracking system includes a distance sensor. The distance sensor may include an infrared camera.

In some embodiments, the processor is configured to measure the distance by identifying a point of contact between a tool held by the user and the ROI.

In some embodiments, the FOV comprises a part of a body of a patient undergoing a surgical procedure (e.g., an open surgical procedure or a minimally invasive interventional procedure).

In some embodiments, the processor is configured to overlay an augmented reality image on the magnified image of the ROI that is presented on the see-through display.

In accordance with several embodiments, a method for imaging includes capturing images of a field of view (FOV), having a first angular extent, using at least one video camera mounted on a head-mounted unit, which includes a see-through display through which a user wearing the head-mounted unit views the FOV. The method also includes processing the captured images so as to generate and present on the see-through display a magnified image of a region of interest (ROI) having a second angular extent within the FOV that is less than the first angular extent.

In some embodiments, the method includes identifying a location of a pupil of an eye of the user wearing the head-mounted unit, wherein processing the captured images comprises generating the magnified image responsively to the location of the pupil. In some embodiments, identifying the location includes identifying respective locations of pupils of both a left eye and a right eye of the user and measuring an interpupillary distance responsively to the identified locations of the pupils. In some embodiments, generating the magnified image comprises presenting respective left and right magnified images of the ROI on the see-through display with a horizontal shift applied to the left and right magnified images.

In some embodiments, the magnified image presented on the see-through display comprises a stereoscopic image of the ROI.

In some embodiments, capturing the images includes capturing left and right video images using left and right video cameras, respectively, mounted respectively in proximity to left and right eyes of the user, and processing the captured images comprises generating the stereoscopic image based on the images captured by both the left and right video cameras.

In some embodiments, the method includes estimating a distance from the head-mounted unit to the ROI based on a disparity between the images captured by both the left and right video cameras and adjusting the stereoscopic image responsively to the disparity.

In accordance with several embodiments, a computer software product, for use in conjunction with a head-mounted unit, which includes a see-through display and at least one video camera, which is configured to capture images of a field of view (FOV), having a first angular extent, that is viewed through the display by a user wearing the head-mounted unit, includes: a tangible, non-transitory computer-readable medium in which program instructions are stored, which instructions, when read by a processor, cause the processor to process the captured images so as to generate and present on the see-through display a magnified image of a region of interest (ROI) having a second angular extent within the FOV that is less than the first angular extent.

For purposes of summarizing the disclosure, certain aspects, advantages, and novel features are discussed herein. It is to be understood that not necessarily all such aspects, advantages, or features will be embodied in any particular embodiment of the disclosure, and an artisan would recognize from the disclosure herein a myriad of combinations of such aspects, advantages, or features.

The embodiments will be more fully understood from the following detailed description thereof, taken together with the drawings.

BRIEF DESCRIPTION OF THE DRAWINGS

Non-limiting features of some embodiments are set forth with particularity in the claims that follow. The following drawings are for illustrative purposes only and show non-limiting embodiments. Features from different figures may be combined in several embodiments.

DETAILED DESCRIPTION

Figure 1:
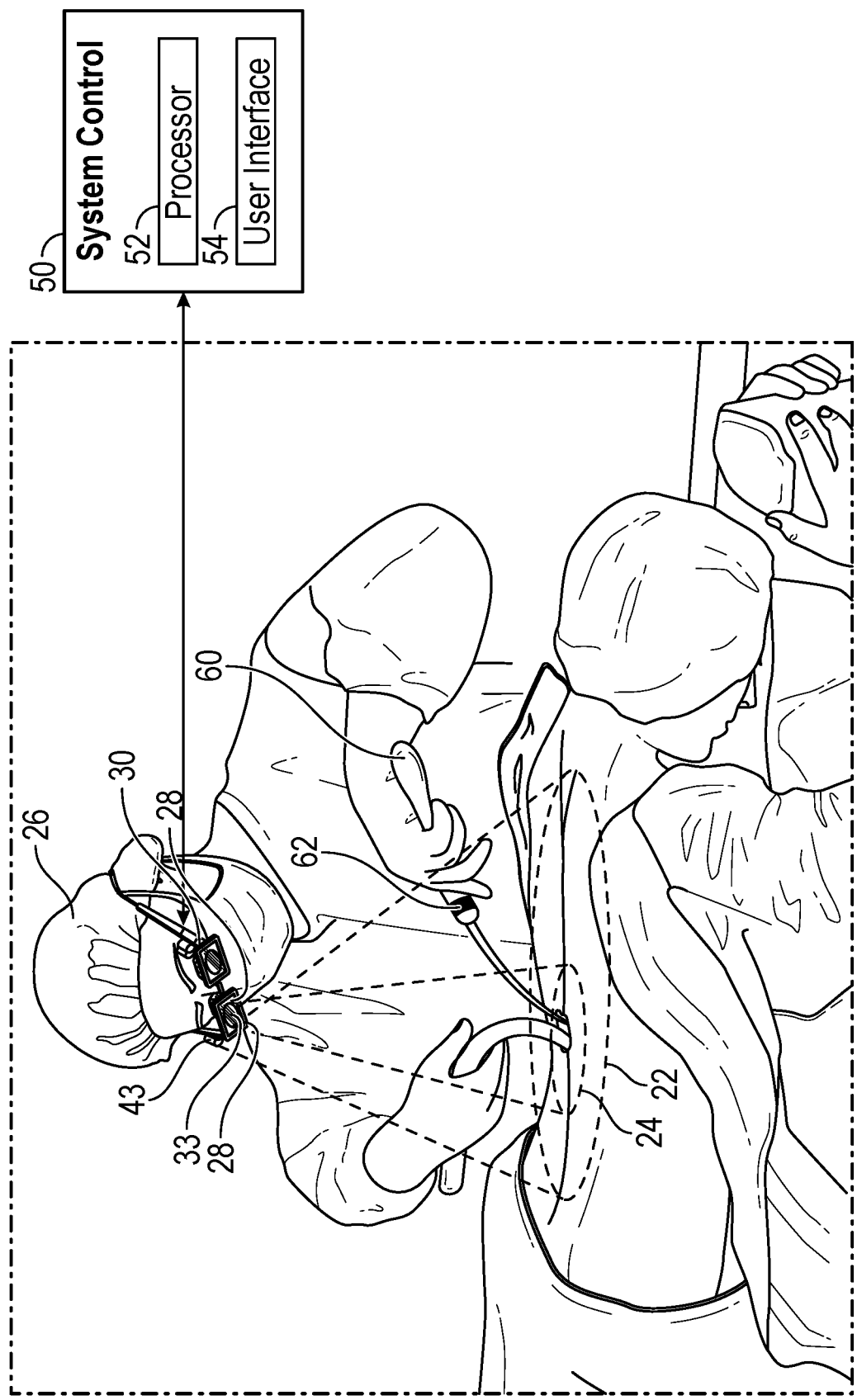
FIG. 1 is a schematic pictorial illustration showing an example head-mounted unit with digital loupe capabilities in use in a surgical procedure, in accordance with an embodiment of the disclosure.

Embodiments of the present disclosure that are described herein provide a digital stereoscopic display and digital loupes utilizing the digital stereoscopic display, in which the digital loupes include a head-mounted video camera and electronic display. In accordance with several embodiments, the digital stereoscopic display and digital loupes described herein advantageously offer a simple off-axis (or parallel) visible light camera setup utilizing a digital convergence and a utilization of a distance or tracking camera of a head-mounted display (HMD) device to provide one or more of the following benefits: (i) less consumption of resources, (ii) robust automatic focusing, (iii) robust stereoscopic tuning. (iv) reduced size and weight, by comparison with traditional optical loupes, and/or (v) improved versatility and ease of use in adjusting the display to accommodate, for example, the user's pupil spacing, region of interest, and/or desired magnification.

In addition, embodiments disclosed herein provide a stereoscopic display of a scene, and specifically, stereoscopic magnification of a scene, to a user (e.g., wearer of the HMD device) without or with minimal visual discomfort and/or visual fatigue. In accordance with several embodiments, such a display may be especially advantageous when displaying images of a scene which is relatively proximate, or close, to the user (e.g., distance around 0.5 meter or up to one meter from the user or wearer), such as when displaying images of a surgical site to a surgeon or other healthcare professional while he or she is operating on a patient or performing an interventional procedure. In accordance with several embodiments, digital loupes can be integrated advantageously with head-mounted displays (e.g., over-the-head mounted device displays or eyewear displays), such as displays that are used, for example, in systems for image-guided surgery, computer-assisted navigation, and stereotactic surgery.

The surgery may comprise open surgery or minimally-invasive surgery (e.g., keyhole surgery, endoscopic surgery, or catheter-based interventional procedures that do not require large incisions, such as incisions that are not self-sealing or self-healing without staples, adhesive strips, or other fasteners or adhesive elements).

Alternatively, stereoscopic display and digital loupes of this sort can be used in other medical applications to provide the practitioner with a stereoscopic and optionally magnified view for purposes of treatment and/or diagnosis.

In some implementations, the digital loupes provide a stereoscopic display that is convergence-based. A distance from the digital loupes to a region of interest may be determined using an optical tracking device or system (such as an infrared camera) or can be set manually by a user or operator. In some implementations, the digital loupes provide stereoscopic viewing during a surgical or other interventional procedure. In some implementations, the digital loupes facilitate adjustment of magnification, focus, angle or view, or other display setting adjustment based on both visible color video camera images (e.g., obtained from one or more RGB cameras) and images received from a tracking device (e.g., an infrared camera or sensor). In some implementations, a single device may be capable of color video and tracking (e.g., an RGB-IR device that includes one or more RGB cameras and one or more infrared cameras or sensors). The tracking device may be used to determine distance or depth measurements from the digital loupes to the region of interest.

In the disclosed embodiments, an imaging apparatus comprises a head-mounted unit (e.g., over-the-head unit or eyewear unit, such as glasses or goggles or visor) with a see-through display and at least one visible light camera (e.g., a video camera) which captures images of a field of view (FOV) that is viewed through the display by a user wearing the head-mounted unit. A processor (integrated within the head-mounted unit or external to the head-mounted unit) processes the captured images so as to generate and present (e.g., output), on the see-through display, a stereoscopic and optionally magnified image of a region of interest (ROI) within the FOV. In accordance with several embodiments, the angular extent of the ROI is less than the total angular extent of the FOV. One or more algorithms may be executed by one or more processors of, or communicatively coupled to, the digital loupes for stereoscopic display of the magnified image.

Other embodiments could include a see-through display that is not head-mounted but is mounted to one or more arms or mechanical structures such that the display is hands-free and mounted over the ROI.

In some embodiments, the processor generates and presents a magnified stereoscopic image on the see-through display, so that the user is able to see a magnified 3D-like view of the ROI. The 3D-like view may be formed by generating a three-dimensional effect which adds an illusion of depth to the display of flat or two-dimensional (2D) images, e.g., images captured by the visible light cameras. The 3D-like view may include 2D or 3D images (e.g., pre-operative and/or intraoperative anatomical medical images), virtual trajectories, guides or icons, digital representations of surgical tools or instruments, operator instructions or alerts, and/or patient information). For this purpose, inter alia, the head-mounted unit (e.g., over-the-head unit or eyewear) may comprise left and right video cameras, which are mounted such that once the HMD device is worn by a user, the cameras will be located in a symmetrical manner with respect to the user's (wearer's) nose. Accordingly, the left and right video cameras may be disposed on a plane substantially parallel to a coronal plane and in a symmetrical manner with respect to a longitudinal plane of users wearing the HMD device. The processor generates the stereoscopic image based on the images captured by both the left and right video cameras. For stereoscopic viewing, the display may comprise left and right near-eye displays, which present respective left and right images (e.g., non-magnified or magnified images) of the ROI in front of the user's left and right eyes, respectively. In several implementations, the processor applies a shift (e.g., horizontal shift) to the left and right magnified images based on the distance from the head-mounted unit to the ROI. The processor may estimate this distance by various distance measurement means, as described further hereinbelow.

The disclosed systems, software products and methods for stereoscopic display may generally apply to the display of images, and specifically to the display of magnified images, in which, any discrepancy between right and left eye images may have a more prominent effect on the quality of the stereoscopic display and the user's (wearer's) experience, including visual discomfort and visual fatigue. Furthermore, such discrepancies and their shortcomings may be further enhanced when the images are displayed on a near-eye display and in an augmented reality setting. The systems, software products and methods described herein will be described with respect to the display of magnified images and for generating a digital loupe, but may also apply, mutatis mutandis, to the display of non-magnified images.

Figure 2:
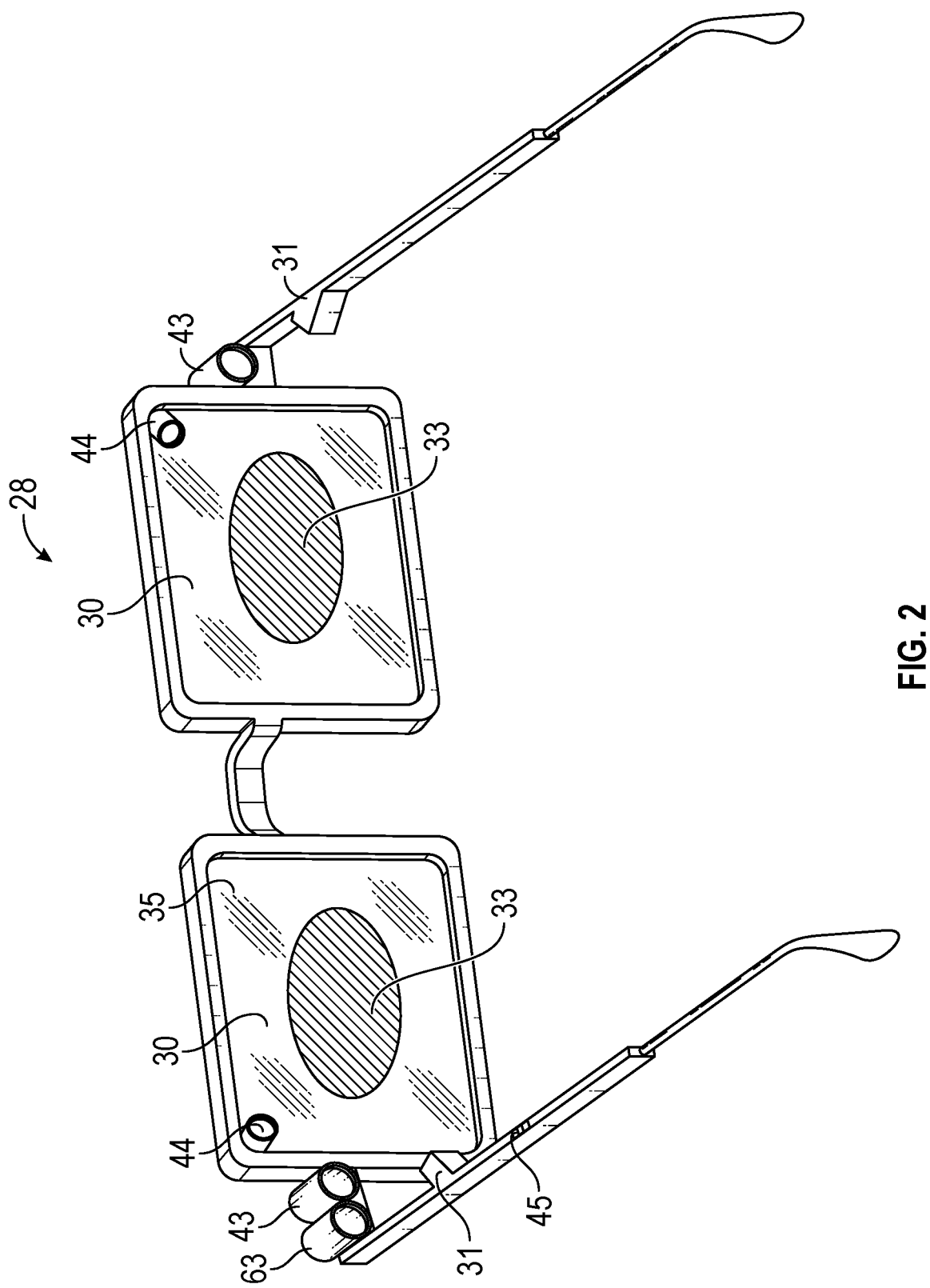
FIG. 2 is a schematic pictorial illustration showing details of the head-mounted unit of FIG. 1.
Figure 5:
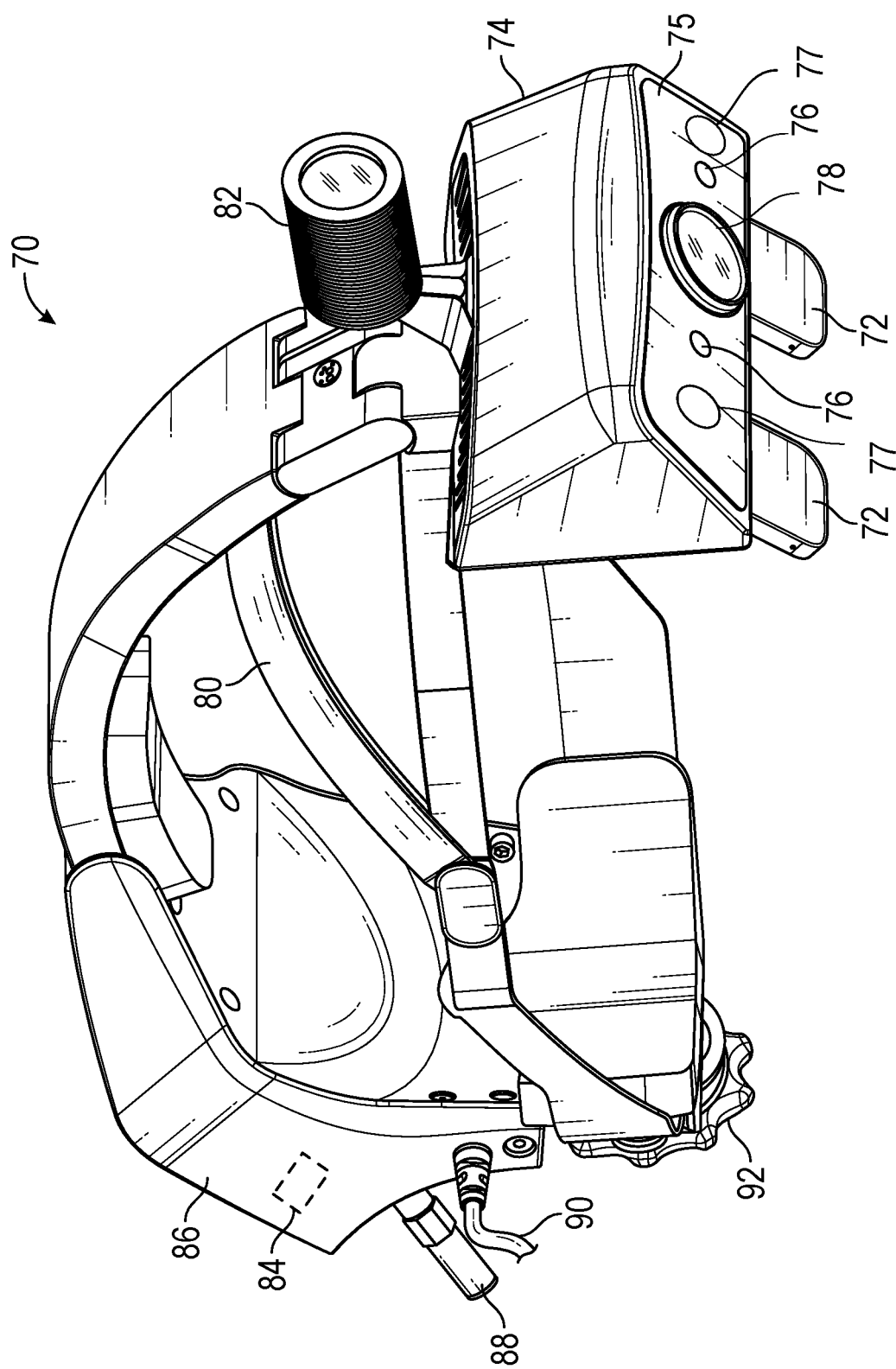
FIG. 5 is a schematic figure illustrating an example head-mounted unit, according to an embodiment of the disclosure.

Reference is now made to FIGS. 1 and 2, which schematically illustrate a head-mounted unit 28 with digital loupe capabilities, in accordance with some embodiments of the disclosure. Head-mounted unit 28 displays magnified images of a region of interest (ROI) 24 viewed by a user, such as a healthcare professional 26. FIG. 1, for example, is a pictorial illustration of a surgical scenario in which head-mounted unit 28 may be used, while FIG. 2, for example, is a pictorial illustration showing details of an example of a head-mounted unit 28 in the form of eyewear. In some embodiments, the head-mounted unit 28 can be configured as an over-the-head mounted headset that may be used to provide digital loupe functionality such as is shown in FIG. 5 and described hereinbelow.

In the embodiment illustrated in FIG. 1, head-mounted unit 28 comprises eyewear (e.g., glasses or goggles) that includes one or more see-through displays 30, for example as described in Applicant's U.S. Pat. No. 9,928,629 or in the other patents and applications cited above, whose disclosure is incorporated herein by reference. Displays 30 may include, for example, an optical combiner, a waveguide, and/or a visor. Displays 30 may be controlled by one or more computer processors. The one or more computer processors may include, for example, a computer processor 52 disposed in a central processing system 50 and/or a dedicated computer processor 45 disposed in head-mounted unit 28. The one or more processors may share processing tasks and/or allocate processing tasks between the one or more processors. The displays 30 may be configured (e.g., programmed upon execution of stored program instructions by the one or more computer processors) to display an augmented-reality image (e.g., one or more 2D images or 3D images) to healthcare professional 26, who is wearing the head-mounted unit 28.

In some embodiments, the augmented reality image viewable through the one or more see-through displays 30 is a combination of objects visible in the real world with the computer-generated image. In some embodiments, each of the one or more see-through displays 30 comprises a first portion 33 and a second portion 35. In some embodiments, the one or more see-through displays 30 display the augmented-reality image.

According to some aspects, the augmented-reality image is presented on displays 30 such that a magnified image of ROI 24 is projected onto the first portion 33, in alignment with the anatomy of the body of the patient that is visible to healthcare professional 26 through the second portion 35. Alternatively, the magnified image may be presented in any other suitable location on displays 30, for example above the actual ROI 24 or otherwise not aligned with the actual ROI 24. Displays 30 may also be used to present additional or alternative augmented reality images (e.g., one or more 2D images or 3D images or 3D-like images), such as described in U.S. Pat. No. 9,928,629 or the other patents and applications cited above.

To capture images of ROI 24, head-mounted unit 28 includes one or more cameras 43. In some embodiments, one or more cameras 43 are located in proximity to the eyes of healthcare professional 26. Camera(s) 43 are located alongside the eyes in FIG. 2; but alternatively, camera(s) 43 may be mounted elsewhere on unit 28, for example above the eyes or below the eyes. According to some aspects, only one camera 43 may be used, e.g., mounted above the eyes near a center of the head-mounted unit 28 or at another location. Camera(s) 43 may comprise any suitable type of miniature color video cameras (e.g., RGB cameras or RGB-IR cameras), including an image sensor (e.g., CMOS sensor) and objective optics (and optionally a color array filter). In accordance with several embodiments, camera(s) 43 capture respective images of a field of view (FOV) 22, which may be considerably wider in angular extent than ROI 24, and may have higher resolution than is required by displays 30.

Figure 3:
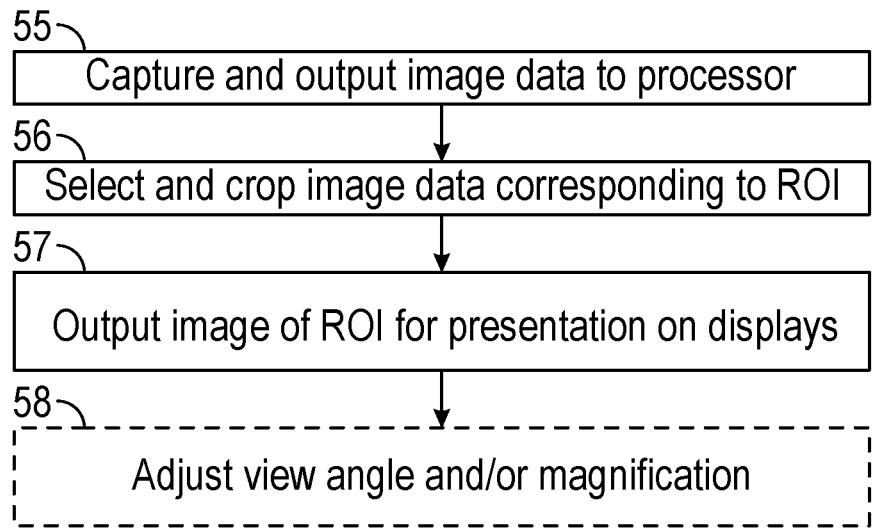
FIG. 3 is a flow chart that schematically illustrates a method for generating magnified images for display.

FIG. 3 is a flow chart that schematically illustrates an example method for generating magnified images for presentation on displays 30. To generate the magnified images that are presented on displays 30, camera(s) 43 (at an image capture step 55) capture and output image data with respect to FOV 22 to processor 45 and/or processor 52. At a data selection step 56, the processor 45, 52 selects and/or crops the part of the image data corresponding to ROI 24. According to some aspects, the processor 45, 52 may select and/or crop a central portion of the image. According to some aspects, the processor 45, 52 may receive or process only information received from a predefined portion, for example a predefined central portion, of the image sensor or light sensor (e.g., CMOS sensor or charge-coupled device image sensor) of the camera(s) 43. Optionally, the processor 45, 52 may then crop a further portion of this predefined portion (e.g., further reduce the information received from the image sensor or light sensor of the camera(s) 43).

In accordance with several embodiments, to improve the stereoscopic view and prevent eye discomfort, the processor 45, 52 may discard non-overlapping portions of the images captured by the left and/or right cameras 43. Non-overlapping image portions may be image portions which show portions of the FOV 22 not captured by both right and left cameras 43, but only by one of the cameras 43. Thus, in accordance with several embodiments, only an overlapping portion of the right and left images corresponding to a portion of the FOV 22 captured by both right and left cameras 43 will be displayed to the user (e.g., wearer) to generate a proper stereoscopic view.

Based on the image information received from cameras 43, the processor 45, 52 (at an image display step 57) generates and outputs a magnified image of the ROI 24 for presentation on displays 30. The magnified images presented on the left and right displays 30 may be shifted (e.g., horizontally shifted) to give healthcare professional 26 a better stereoscopic view. In some embodiments, processor 45 and/or processor 52 may be configured to adjust the resolution of the magnified images of the ROI 24 to match the available resolution of displays 30, so that the eyes see an image that is clear and free of artifacts. According to some aspects, healthcare professional 26 may adjust the FOV 22 (which includes ROI 24) by altering a view angle (e.g., vertical view angle to accommodate the specific user's height and/or head posture), and/or the magnification of the image that is presented on displays 30, for example by means of a user interface 54 of processing system 50 (optional user adjustment step 58). User interface 54 may comprise hardware elements, such as knobs, buttons, touchpad, touchscreen, mouse, and/or a joystick, as well as software-based on-screen controls (e.g., touchscreen graphical user interface elements and/or voice controls (e.g., voice-activated controls using a speech processing hardware and/or software module). Additionally, or alternatively, the vertical view angle of the head-up display unit may be manually adjusted by the user (e.g., via a mechanical tilt mechanism).

The head-mounted unit 28 may be calibrated according to the specific types of users or to the specific user (e.g., to accommodate the distance between the user's pupils (inter-pupillary distance) or to ranges of such a distance) and his or her preferences (e.g., visualization preferences). For this purpose, in some embodiments, the location of the portion of the displays 30 on which images are presented (e.g., displays portion 33 of FIG. 2), or the setup of camera(s) 43, or other features of head-mounted unit 28 may be produced and/or adjusted according to different ranges of measurements of potential users or may be custom-made, according to measurements provided by the user, such as healthcare professional 26. Alternatively or additionally, the user may manually adjust or fine-tune some or all of these features to fit his or her specific measurements or preferences.

In some embodiments, the head-mounted unit is configured to display and magnify an image, assuming the user's gaze would be typically straightforward. In some embodiments, the user's pupils' location, gaze and/or line of sight may be tracked. For example, one or more eye trackers 44 may be integrated into head-mounted unit 28, as shown in FIG. 2, for real-time adjustment and possibly for purposes of calibration. Eye trackers 44 comprise miniature video cameras, possibly integrated with a dedicated infrared light source, which capture images of the eyes of the user (e.g., wearer) of head-mounted unit 28. Processor 45 and/or 52 or a dedicated processor in eye trackers 44 processes the images of the eyes to identify the locations of the user's pupils. Additionally or alternatively, eye trackers 44 may detect the direction of the user's gaze using the pupil locations and/or by sensing the angle of reflection of light from the user's corneas.

In some embodiments, processor 45 and/or processor 52 uses the information provided by eye trackers 44 with regard to the pupil locations in generating a magnified image for presentation on displays 30. For example, the processor 45, 52 may dynamically determine a crop region on each sensor of each camera to match the user's gaze direction. Accordingly, the image generated based on the part of the sensor corresponding to the shifted crop region or ROI 24 may be magnified and output for display.

For improved stereoscopic display, the processor 45, 52 may be programmed to calculate and apply the shift (e.g., horizontal shift) to the left and right images presented on displays 30 to reduce the parallax between the user's eyes at the actual distance from head-mounted unit 28 to ROI 24. In other words, the shift (e.g., horizontal shift) of the left and right images depends on the distance and geometry of the cameras (e.g., relative to the ROI 24). The distance to the ROI 24 can be estimated by the processor 45, 52 in a number of different ways, as will be described further below:

In some embodiments, the processor 45, 52 may measure the disparity between the images of ROI 24 captured by left and right cameras 43 based on image analysis and may compute the distance to the ROI 24 based on the measured disparity and the known baseline separation between the cameras 43.

In some embodiments, based on signals provided by the one or more eye trackers 44, the processor 45, 52 may compare the gaze angles of the user's left and right eyes to find the distance at which the eyes converge on ROI 24.

In some embodiments, head-mounted unit 28 may comprise a distance sensor or tracking device 63, which measures the distance from the head-mounted unit 28 to ROI 24. The distance sensor or tracking device 63 may comprise an infrared sensor, an image-capturing tracking camera, an optical tracker, or other tracking/imaging device for determining location, orientation, and/or distance. The distance sensor or tracking device 63 may also include a light source to illuminate the ROI 24 such that light reflects from a marker on a patient or tool toward the distance sensor or tracking device 63. In some embodiments, an image-capturing device of the tracking device 63 comprises a monochrome camera with a filter that passes only light in the wavelength band of light source. In one implementation, the light source may be an infrared light source, and the camera may include a corresponding infrared filter. In other implementations, the light source may comprise any other suitable type of one or more light sources, configured to direct any suitable wavelength or band of wavelengths of light, and mounted on head-mounted unit 28 or elsewhere in the operating room.

In some embodiments, distance sensor or tracking device 63 may comprise a depth sensor configured to illuminate the FOV 22 with a pattern of structured light (e.g., via a structured light projector) and capture and process or analyze an image of the pattern on the FOV 22 in order to measure the distance. In this case, distance sensor or tracking device 63 may comprise a monochromatic pattern projector such as of a visible light color and a visible light camera.

In some embodiments, the processor 45, 52 may measure the distance from head-mounted unit 28 to an element in or adjacent to the ROI 24 while, utilizing, for example, a tracking camera of the head-mounted unit 28. In such embodiments, distance sensor 63 may be the tracking camera. With reference to FIG. 1, tool 60 may be manipulated by healthcare professional 26 within ROI 24 during the surgical or other interventional or diagnostic medical procedure. The tool 60 may be, for example, a tool used for inserting a surgical implant, such as a pedicle screw, stent, cage, or interbody device, into the body (e.g., bone, vessel, body lumen, tissue) of a patient. For this purpose, for example, tool 60 may comprise an optical marker 62 (example shown in FIG. 1), having a known pattern detectable by distance sensor or tracking device 63. An optical patient marker (not shown in the figures), which may be fixedly attached to the patient (e.g., to the patient's skin or a portion of the patient's anatomy, such as a portion of the patient's spine) may also be detectable by distance sensor or tracking device 63. The processor 45, 52 may process images of marker 62 in order to determine (e.g., measure) the location and orientation of tool 60 with respect to the head-mounted unit 28 or wearer of the head-mounted unit 28, and thus to determine (e.g., estimate or calculate) the distance between the ROI 24 and the user (e.g., wearer of the head-mounted unit 28). The distance may be determined by the distance sensor 63 (such as an infrared camera, optical sensor, or other tracking device). In some embodiments, the processor 45, 52 may process images of the patient marker or of the patient marker and tool marker in order to determine the relative location and orientation of the patient marker or of patient marker and tool marker with respect to the head mounted unit 28 or the user, and thus to determine the distance between the user and ROI 24. Such head mounted display systems are described, for example, in the above-referenced U.S. Pat. Nos. 9,928,629, 10,835,296, 10,939,977, PCT International Publication WO 2019/211741, U.S. Patent Application Publication 2020/0163723, and PCT International Publication WO 2022/053923, which were previously incorporated by reference. Markers are described, for example, in U.S. Pat. No. 10,939,977, the content of which is also hereby incorporated herein by reference.

The processor 45, 52 may compute the distance to ROI 24 based on any one of the above methods, or a combination of such methods or other methods that are known in the art. Alternatively or additionally, healthcare professional 26 may adjust the shift (e.g., horizontal shift) or location of the overlapping portions of the captured images manually.

In accordance with several embodiments, utilizing optical tracking of the head mounted unit 28 as disclosed above to dynamically provide the distance to the ROI 24 allows for a less resource consuming and more robust distance measurement, for example with respect to distance measurement based on image analysis.

The distance sensor or tracking device 63 may comprise a light source and a camera (e.g., camera 43 and/or an IR camera). The light source may be adapted to simply illuminate the ROI 24 (e.g., a projector, a flashlight or headlight). The light source may alternatively include a structured light projector to project a pattern of structured light onto the ROI 24 that is viewed through displays 30 by a user, such as healthcare professional 26, who is wearing the head-mounted unit 28. The camera (e.g., camera(s) 43 and/or infrared camera) may be configured to capture an image of the pattern on the ROI and output the resulting distance or depth data to processor 52 and/or processor 45. The distance or depth data may comprise, for example, either raw image data or disparity values indicating the distortion of the pattern due to the varying depth of the ROI 24.

Alternatively, distance sensor or tracking device 63 may apply other depth mapping technologies in generating the depth data. For example, the light source may output pulsed or time-modulated light, and the camera (e.g., camera 43) may be modified or replaced by a time-sensitive detector or detector array to measure the time of flight of the light to and from points in the ROI 24. These and all other suitable alternative depth mapping technologies are considered to be within the scope of the present disclosure.

Figure 4:
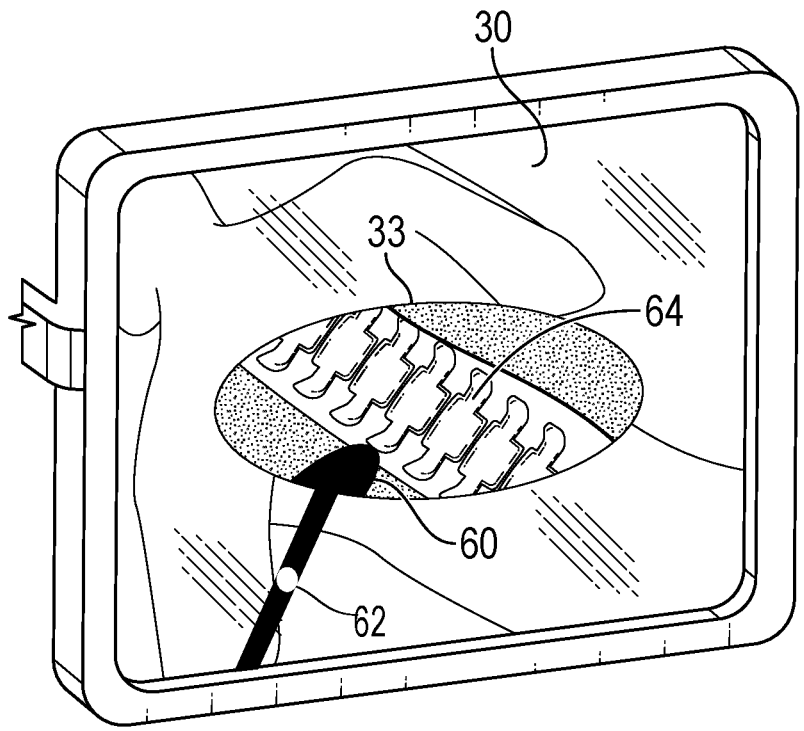
FIG. 4 is a schematic pictorial illustration showing a magnified image presented in a portion of a display, in accordance with an embodiment of the disclosure.

FIG. 4 is a schematic pictorial illustration showing a magnified image presented in portion 33 of display 30, in accordance with an embodiment of the disclosure. The magnified image shows an incision 62 made by healthcare professional 26 in a back 60 of a patient, with an augmented-reality overlay 64 showing at least a portion of the patient's vertebrae (e.g., cervical vertebrae, thoracic vertebrae, lumbar vertebrae, and/or sacral vertebrae) and/or sacroiliac joints, in registration with the magnified image. For example, overlay 64 may include a 2D image or a 3D image or model of the region of interest (ROI) 24 magnified to the same proportion as the magnified image displayed in portion 33 (e.g., a video image). The overlay 64 may be then augmented or integrated, for example, on the digitally magnified video image and in alignment with the magnified image. Overlay 64 may be based, for example, on a medical image (e.g., obtained via computed tomography (CT), X-ray, or magnetic resonance imaging (MRI) systems) acquired prior to and/or during the surgical procedure or other interventional or diagnostic procedure (e.g., open surgical procedure or minimally invasive procedure involving self-sealing incisions, such as catheter-based intervention or laparoscopic or keyhole surgery). The overlay image may be aligned or otherwise integrated with the magnified image by using image analysis (e.g., by feature-based image registration techniques). In some embodiments, such alignment and/or registration may be achieved by aligning the overlay image with the underlying anatomical structure of the patient, while assuming the magnified image is substantially aligned with the patient anatomy. Alignment and/or registration of such an overlay with the underlying anatomical structure of a patient is described, for example, in the above-mentioned U.S. Pat. No. 9,928,629, which was previously incorporated by reference, and as well as in US Patent Application Publication 2021/0161614, the entire contents of which are incorporated herein by reference. In some embodiments, one or more eye trackers (e.g., eye trackers 44) may be employed which may allow a more accurate alignment of the magnified video image with the underlying patient anatomy. The eye tracker may allow capturing the ROI and in addition a display of the image on the near-eye display in alignment with the user's line of sight and the ROI in a more accurate manner when the user is not looking straightforward.

In some procedures, such as discectomy or spinal fusion, the surgeon needs to identify the patient bone structure for purposes of localization and navigation to a site of interest. The surgeon may then remove tissue and muscles to reach or expose the bone, at least to some extent. This preliminary process of "cleaning" the bone may require time and effort. The site of interest may be then magnified, for example using digital magnification, to facilitate the identification of the patient anatomy and the performance of the procedure. It may be still challenging, however, to identify the patient anatomy and navigate during the procedure due to tissue and muscles left in the site of interest.

To address this difficulty, a 3D spine model (generated from an intraoperative or preoperative CT scan or other medical image scan) can be presented with (e.g., superimposed on or integrated into) the magnified video image of the patient anatomy, as shown in FIG. 4. The alignment of this image with the patient's anatomy can be achieved by means of a registration process, which utilizes a registration marker mounted on an anchoring implement, for example a marker attached to a clamp or a pin. Registration markers of this sort are shown and described, for example, in the above-mentioned U.S. Pat. No. 9,928,629, in US Patent Application Publication 2021/0161614, which were previously incorporated by reference, as well as in US Patent Application Publication 2022/0142730, the entire contents of which are incorporated herein by reference. For this purpose, an intraoperative CT scan or other medical image scan of the ROI 24 is performed, including the registration marker. An image of the ROI 24 and of a patient marker attached (e.g., fixedly attached) to the patient anatomy or skin and serving as a fiducial for the ROI 24 is captured, for example using a tracking camera such as distance sensor or tracking device 63 of head-mounted unit 28 or camera 78 of head-mounted unit 70. The relative location and orientation of the registration marker and the patient marker are predefined or determined, e.g., via the tracking device. The CT or other medical image and tracking camera image(s) may then be registered based on the registration marker and/or the patient marker. The anatomical image model (e.g., CT model) may be then displayed in a magnified manner (corresponding to the video magnification) and aligned with the video image.

The anatomical image model (e.g., CT model) may be presented on display(s) 30, for example, in a transparent manner, in a semi-transparent manner, in an opaque manner, or in a substantially opaque manner and/or as an outline of the bone structure. Thus, in accordance with several embodiments, the surgeon or healthcare professional 26 will advantageously be able to "see" the bone structure which lies beneath tissue shown in the video image and/or "see" it in a clearer manner. This will facilitate localization and navigation (for example of tool 60) in the patient's anatomy.

Furthermore, using such a view may shorten the "cleaning" process or even render it unnecessary.

Other images may be included (e.g., augmented on or integrated with) the magnified video image, such as a planning indication (such as planning of a bone-cut or insertion of an implant, such as a bone screw or cage).

The presentation of such information in an augmented manner on the video image may be controlled by the user (e.g., on or off or presentation adjustment via the user interface 54).

Additional examples of procedures in which the above may be utilized include vertebroplasty, vertebral fusion procedures, removal of bone tumors, treating burst fractures, or when bone fracturing is required to handle a medical condition (such as scoliosis) or to access a site of interest. Other examples may include arthroscopic procedures (including joint replacement, such as hip replacement, knee replacement, shoulder joint replacement or ankle joint replacement; reconstructive surgery (e.g., hip surgery, knee surgery, ankle surgery, foot surgery); joint fusion surgery; laminectomy; osteotomy; neurologic surgery (e.g., brain surgery, spinal cord surgery, peripheral nerve procedures); ocular surgery; urologic surgery; cardiovascular surgery (e.g., heart surgery, vascular intervention); dental surgery; oncology procedures; biopsies; organ transplants; or other medical procedures.

FIG. 5 is a schematic pictorial illustration showing details of a head-mounted display (HMD) unit 70, according to another embodiment of the disclosure. HMD unit 70 may be worn by healthcare professional 26, and may be used in place of head-mounted unit 28 (FIG. 1). HMD unit 70 comprises an optics housing 74 which incorporates a camera 78, and in the specific embodiment shown, an infrared camera. In some embodiments, the housing 74 comprises an infrared-transparent window 75, and within the housing, e.g., behind the window, are mounted one or more, for example two, infrared projectors 76. Additionally or alternatively, housing 74 may contain one or more color video cameras 77, as in head-mounted unit 28, and may also contain eye trackers, such as eye trackers 44.

In some embodiments, mounted on housing 74 are a pair of augmented reality displays 72, which allow healthcare professional 26 to view entities, such as part or all of patient 24, through the displays 72, and which are also configured to present to healthcare professional 26 images or any other information. In some embodiments, displays 72 may also present stereoscopic images of ROI 24 (e.g., video images) and particularly magnification of such images of ROI 24 (FIG. 1), as described above.

In some embodiments, HMD unit 70 includes a processor 84, mounted in a processor housing 86, which operates elements of the HMD unit. In some embodiments, an antenna 88, may be used for communication, for example with processor 52 (FIG. 1).

In some embodiments, a flashlight 82 may be mounted on the front of HMD unit 70. In some embodiments, the flashlight may project visible light onto objects so that the professional is able to clearly see the objects through displays 72. In some embodiments, elements of the HMD unit 70 are powered by a battery (not shown in the figure), which supplies power to the elements via a battery cable input 90.

In some embodiments, HMD unit 70 is held in place on the head of healthcare professional 26 by a head strap 80, and the healthcare professional 26 may adjust the head strap by an adjustment knob 92.

Elements shown and described with respect to HMD unit 70, such as antenna 88 and flashlight 82, may be also included, mutatis mutandis, in HMD unit 28, and vice versa.

Figure 6:
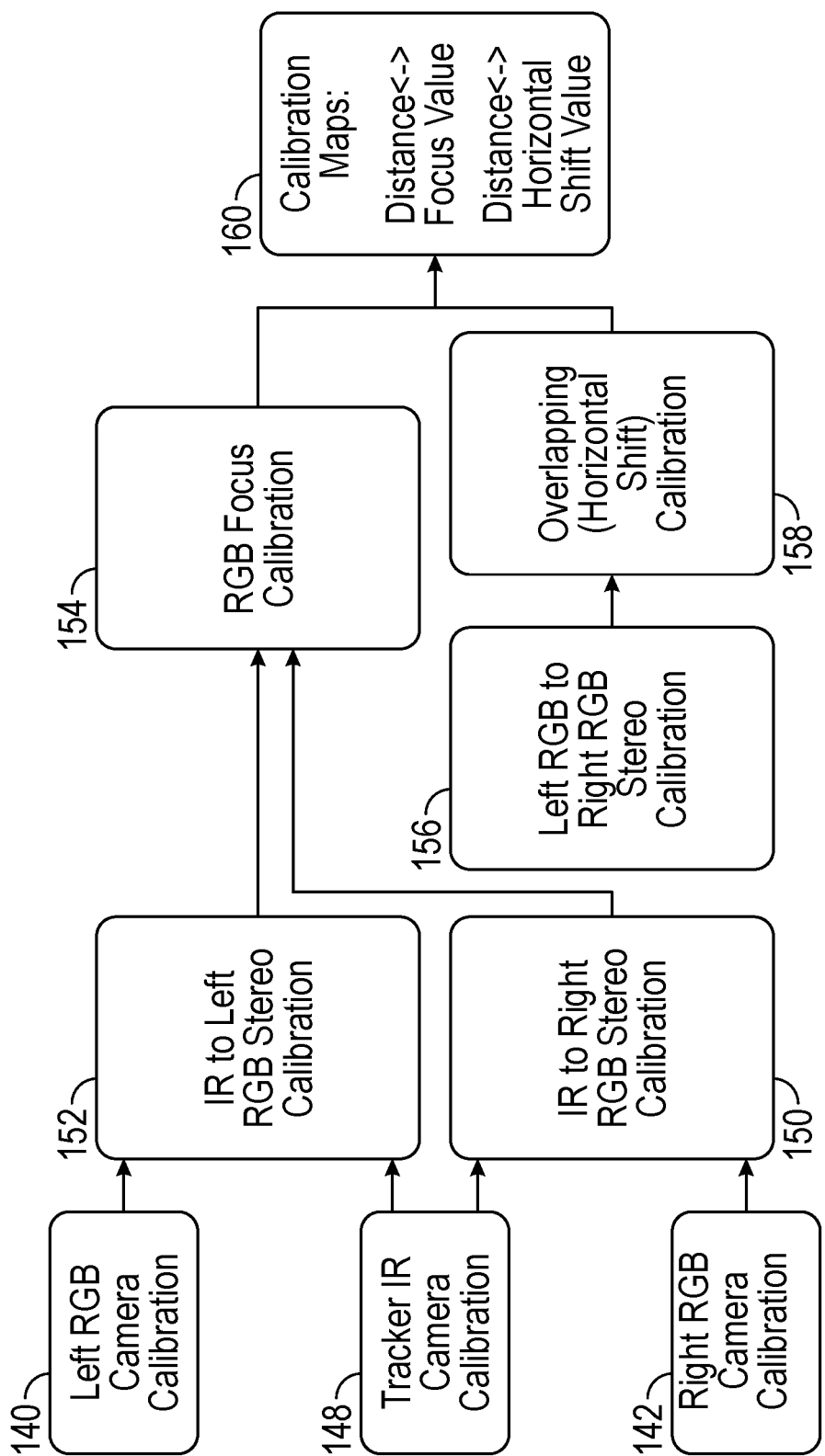
FIG. 6 is a flow chart that schematically illustrates a method for calibrating a stereoscopic digital loupe, in accordance with an embodiment of the disclosure.
Figure 7:
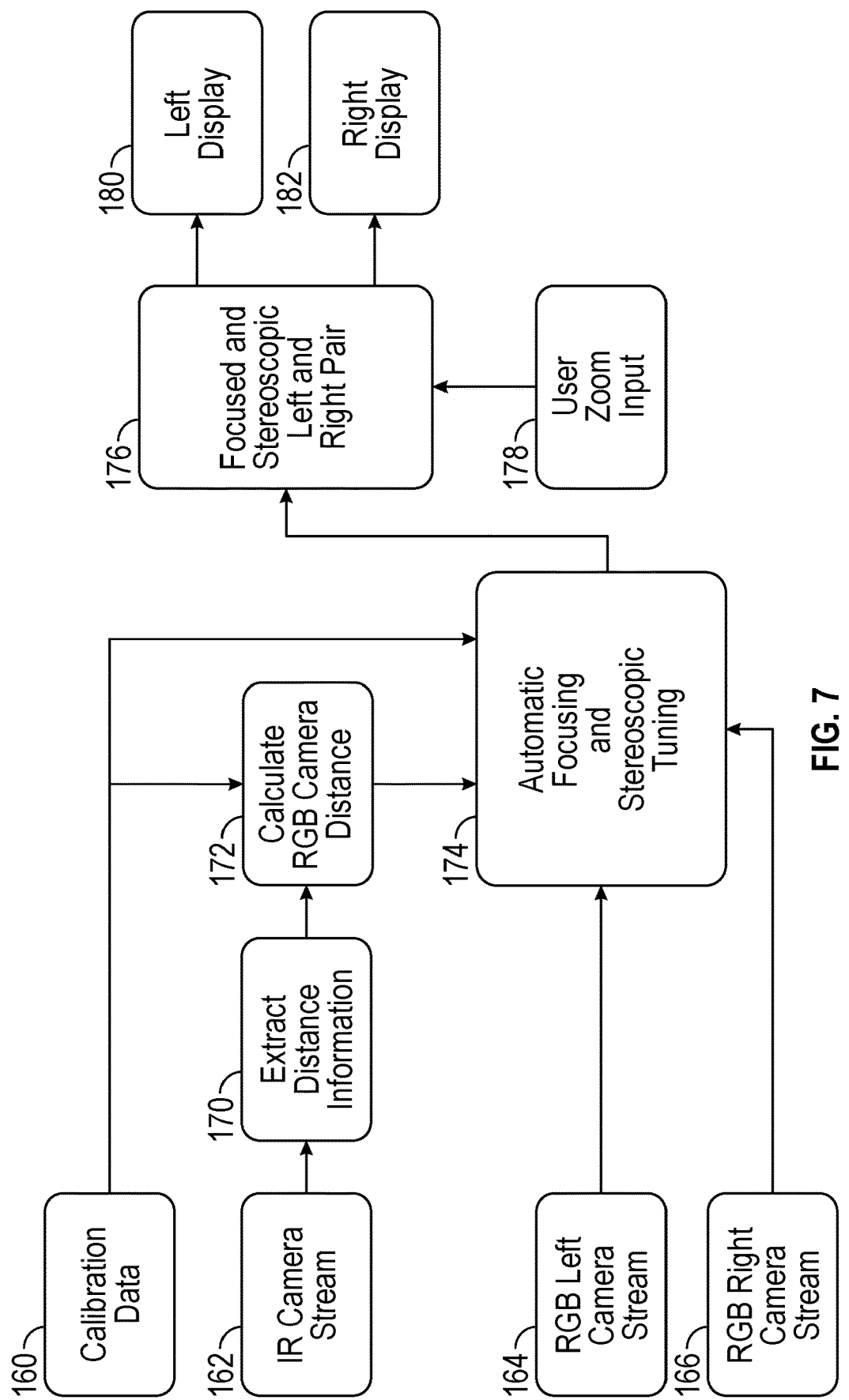
FIG. 7 is a flow chart that schematically illustrates a method for generating a stereoscopic digital loupe display, in accordance with an embodiment of the disclosure.

FIG. 6 is a flow chart that schematically illustrates a method for calibrating a stereoscopic digital loupe, in accordance with an embodiment of the disclosure. For the sake of clarity and concreteness, this method, as well as the method of FIG. 7, is described hereinbelow with reference to the components of head-mounted unit 28 (FIGS. 1 and 2). The principles of these methods, however, may similarly be applied to other stereoscopic digital loupes, such as a loupe implemented by HMD unit 70.

In general, in the context of the present description, when a computer processor is described as performing certain steps, these steps may be performed by one or more external computer processors (e.g., processor 52) and/or one or more computer processors (e.g., processor 45, 84) that is integrated within the HMD unit 28, 70. The processor or processors carry out the described functionality under the control of suitable software, which may be downloaded to the system in electronic form, for example over a network, and/or stored on tangible, non-transitory computer-readable media, such as electronic, magnetic, or optical memory.

In accordance with several embodiments, in generating and presenting magnified stereoscopic images, it is important that the visible light cameras be properly calibrated and registered with one another and with the tracking device. The calibration may include both one or more color video cameras and a tracking device, such as an infrared camera or sensor (e.g., distance sensor 63). In some embodiments, right and left cameras 43 (e.g., color video cameras, such as RGB cameras) and an infrared tracking camera (e.g., an infrared tracking camera in distance sensor or tracking device 63) are calibrated by one or more processors (such as processor 45, 52), at camera calibration steps 140, 142, and 148. These steps may be carried out, for example, by capturing images of a test pattern using each of the cameras and processing the images to locate the respective pixels and their corresponding 3D locations in the captured scene. If appropriate, the camera calibration may also include estimation and correction of distortion in each of the cameras. In some implementations, at least one of the right and left cameras and infrared tracking camera comprises an RGB-IR camera that includes both color video and infrared sensing or imaging capabilities in a single device.

After the individual cameras have been calibrated, the processor 45, 52 may register, by rigid transformations, the infrared camera with the right color video camera and with the left color video camera at right and left camera calibration steps 150 and 152, correspondingly. Such registration may include measuring the distances between the optical centers of each of color video cameras 43 and the infrared camera in distance sensor or tracking device 63, at right and left camera calibration steps 150 and 152. The processor 45, 52 may also measure the respective rotations of the color cameras 43 and the infrared camera of the distance sensor or tracking device 63. These calibration parameters or values serve as inputs for a focus calibration step 154, in which the focusing parameters of cameras 43 are calibrated against the actual distance to a target that is measured by the distance sensor or tracking device 63. On the basis of this calibration, it may be possible to focus both cameras 43 to the distance of ROI 24 that is indicated by the distance sensor or tracking device 63.

For enhanced accuracy in accordance with several embodiments, right and left cameras 43 (e.g., color video cameras) may also be directly registered at a stereo calibration step 156. The registration may include measurement of the distance between the optical centers of right and left cameras 43 and the relative rotation between the cameras 43, and may also include rectification, for example. At an overlapping calibration step 158, the processor 45, 52 may use these measurements in calculating an appropriate shift (e.g., horizontal shift) to be applied on the display of each of the images captured by the left and right cameras 43 (e.g., color video cameras) in correspondence to the cameras' distance from the ROI 24. The horizontal shift is applied in the display of each image and to the center of the overlapping portion of the image such that the center of the overlapping image portion is shifted to the center of the display area (e.g., to the center of portion 33 of display 30 of HMD unit 28). This application may be performed to reduce the parallax between pixels of the right and left eye images to improve the stereoscopic display, as will be further detailed in connection with FIG. 6. The overlapping image portions may vary as a function of the distance from cameras 43 to ROI 24.

At the conclusion of this calibration process, the processor 45, 52 stores calibration maps at step 160 in a memory that is associated with head-mounted unit 28. The calibration maps may include the mapping between ROI distance and the focusing parameter of cameras 43, as calculated at step 154, and a mapping between ROI distance and the horizontal shift of the overlapping left and right camera image portions that have been calculated at step 158.

The calibration maps or calibration mapping may include or refer to the generation of a lookup table, one or more formulas, functions, or models or to the estimation of such. Accordingly, processor 45, 52 may obtain or calculate the focus and/or horizontal shift values while using such one or more lookup tables, formulas, models or a combination of such once distance to the ROI is provided.

According to some embodiments, cameras 43 are mounted on the HMD unit 28 in a parallel or off-axis setup, as shown, for example in FIG. 2. To allow a stereoscopic view, at least some of the right and left images should overlap. Such overlapping may occur when the right and left cameras 43 or the right and left cameras' FOVs at least partially converge. An actual FOV of a camera may be determined, for example, by defining a crop region on the camera sensor. In a parallel setup of cameras, such overlap may not occur or may be insignificant at planes which are substantially or relatively close to the cameras (e.g., at a distance of 0.5 meter, 0.4 to 0.6 meters, or up to one meter from the user, such as when displaying images of a patient surgical site to a surgeon while he is operating on the patient).

In such a case, a digital convergence may be generated by horizontally shifting the crop region on the cameras' sensors. A crop region may be determined on the sensor of each camera such that a full overlap between the right and left images is received at a determined distance from the ROI plane. The crop regions of the right and left cameras sensors may be identical in size (to receive same image size) and symmetrical around the centers of the sensors. A digital convergence may be generated at a determined distance from the ROI by changing or horizontally shifting each of the crop regions of the cameras' sensors to an asymmetrical location with respect to the corresponding sensor center. Furthermore, the crop regions may be shifted such that a complete or full image overlapping is received at a determined distance from the ROI e.g., while the user or wearer of the head-mounted unit 28, 70 is standing at that distance, looking straightforward at the ROI and while the camera's plane is parallel to the ROI plane. A full image overlap may be received when the scene displayed by one image is identical or the same as the scene display by the other image. A full image overlap may allow the user to receive maximal information available by the configuration of the cameras (e.g., actual sensors FOV determined by the crops regions of the sensors).

Alternatively, in accordance with some embodiments, the cameras setup may not be parallel, such that a digital convergence will not be required. However, such a setup may have effects, such as vertical parallax, which may significantly reduce the quality of the stereoscopic display, in some embodiments.

In a parallel setup, a convergence and advantageously full overlap plane distance and corresponding sensor crop regions may be predetermined. Such a distance will be referred to herein as the default distance. For example, for a surgery setting, this may be the typical working distance of a surgeon 22 wearing the HMD unit 28, 70 from the surgical site or ROI 24. A full images overlap allows the user (e.g., wearer of the HMD unit 28, 70) to receive the maximal information allowed by the configuration of the cameras 43 (e.g., actual sensors FOV).

Accordingly, the calibration process as described in and with respect to FIG. 6, may include calibration such that the default or initial focus value will be a focus value corresponding to the default distance. The calibration of the cameras may be with respect to the determined sensor crop regions. The real time adjustment as described hereinbelow with reference to FIG. 7, may be performed with respect to the determined default distance and sensor crop regions.

FIG. 7 is a flow chart that schematically illustrates a method for generating a stereoscopic digital loupe display, in accordance with an embodiment of the disclosure. This method receives as its inputs a stream of infrared video images (e.g., block 162) output by distance sensor or tracking device 63 and respective streams of color video images (e.g., blocks 164, 166) that are output by the left and right color cameras 43, along with calibration data (e.g., calibration maps) generated (e.g., calculated) and stored as described in step 160 in connection with FIG. 6. Left camera and right camera may have the same frame rate, e.g., 60 frames per second. In some embodiments, left camera image capturing and/or image stream 164 and right camera image capturing and/or image stream 166 may be synchronized. In some embodiments, IR camera image capturing and/or image stream 162, left camera image capturing and/or image stream 164 and right camera image capturing and/or image stream 166 are synchronized. In a setting in which the distance between the cameras and the ROI does not change rapidly, for example, the distance between a surgeon wearing the HMD and a surgical site during a medical procedure, there may be an offset between the capturing and/or image streaming of right and left cameras. The processor 45, 52 processes infrared video images from block 162 in order to extract distance information at a distance extraction step 170. The processor 45, 52 calculates the distance from each of the cameras (e.g., from each of cameras 43) to ROI 24 based on the extracted distance from the distance sensor or tracking device 63 (e.g., infrared camera of the distance sensor or tracking device 63) to the ROI 24, e.g., using the registrations calculated at steps 150 and 152 of FIG. 6, correspondingly, at a distance calculation step 172.

The processor 45, 52 then sets the focusing parameters or values of cameras 43 to match the distance to ROI 24, based on calibration data (e.g., calibration maps) generated at block 160, at a focusing step 174. The processor 45, 52 also tunes the stereoscopic display by shifting, (e.g., horizontally shifting) the overlapping image portions and discarding the non-overlapping image portions. The processor 45, 52 applies the horizontal shift values in calibration maps or according to the mapping generated at block 160 in displaying the pair of images captured simultaneously or substantially simultaneously by right and left cameras 43 on right and left displays 30, correspondingly. The horizontal shift map or mapping values are configured such that in each distance the center of the overlapping portion in each image is shifted to the center of display portion 33 to reduce parallax and allow a better stereoscopic view and sensation. Thus, in accordance with several embodiments, the horizontal parallax between the centers of the overlapping image portions is zero or substantially zero. In some embodiments the horizontal shift value may correspond to the horizontal shift length (e.g., in pixels). In some embodiments, the horizontal shift value may correspond to the coordinates (e.g., in the display coordinate system) of the center pixel of the overlapping image portion. Furthermore, the non-overlapping image portions may be discarded. Portions of the non-overlapping image portions may be discarded simply due to the horizontal shift which places them externally to display portion(s) 33.

Consequently, these image portions may not be displayed to the user. The rest of the non-overlapping image portions or all of the non-overlapping image portions may be discarded, for example, by darkening their pixels and/or by cropping. The result of this step is a stream of focused image pairs (block 176), having only overlapping content, for proper stereoscopic presentation on displays 30. The magnification of these stereoscopic image pairs is set to a desired value, which may be optionally adjusted in accordance with a user-controlled zoom input (block 178). The resulting left and right magnified images (blocks 180, 182) are output to left and right displays 30, respectively, and are updated as new images are captured and processed.

It should be noted that the process described in FIG. 7 except for step 160 may be repeatedly performed (e.g., once in a predefined time interval and up to cameras 43 image capture rate), and such that a video of the captured ROI 24 is stereoscopically displayed on display 30.

In some embodiments, the crop region of the sensors of cameras 43 may be dynamically determined or dynamically changed in real-time based on the repeatedly determined distance from cameras 43 to the ROI 24 such that for each distance a full images overlap is received. In some embodiments, the eye trackers 44 may be employed to dynamically determine the ROI 24 by dynamically and repeatedly determining the user's gaze direction or line-of-sight. The dynamic determination of the sensors crop region may then be dynamically or repeatedly determined also based on the current or simultaneously determined ROI.

The processors 45, 52 may include one or more central processing units (CPUs) or processors, which may each include a conventional or proprietary microprocessor. The processors 45, 52 may be communicatively coupled to one or more memory units, such as random-access memory (RAM) for temporary storage of information, one or more read only memory (ROM) for permanent storage of information, and one or more mass storage devices, such as a hard drive, diskette, solid state drive, or optical media storage device. The processors 45, 52 (or memory units communicatively coupled thereto) may include modules comprising program instructions or algorithm steps configured for execution by the processors 45, 52 to perform any of all of the processes or algorithms discussed herein. The processors 45, 52 may be communicatively coupled to external devices (e.g., display devices, data storage devices, databases, servers, etc. over a network via a network communications interface.

In general, the word "module," as used herein, refers to logic embodied in hardware or firmware, or to a collection of software instructions, possibly having entry and exit points, written in a programming language, such as, for example, Java, Lua, C, C#, or C++. A software module or product may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the processors 45, 52, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules but may be represented in hardware or firmware. Generally, any modules or programs or flowcharts described herein may refer to logical modules that may be combined with other modules or divided into sub-modules despite their physical organization or storage.

Although the drawings relate specifically to surgery on the spine, the principles of the present disclosure may similarly be applied in loupes for other sorts of medical and dental procedures, as well loupes for other applications, such as but not limited to arthroscopic procedures (including joint replacement, such as hip replacement, knee replacement, shoulder joint replacement or ankle joint replacement; reconstructive surgery (e.g., hip surgery, knee surgery, ankle surgery, foot surgery); joint fusion surgery; laminectomy; osteotomy; neurologic surgery (e.g., brain surgery, spinal cord surgery, peripheral nerve procedures); ocular surgery; urologic surgery; cardiovascular surgery (e.g., heart surgery, vascular intervention); oncology procedures; biopsies; tendon or ligament repair; and/or organ transplants.

In the foregoing specification, the systems and processes have been described with reference to specific embodiments thereof. It will, however, be evident that various modifications and changes may be made thereto without departing from the broader spirit and scope of the embodiments disclosed herein. The specification and drawings are, accordingly, to be regarded in an illustrative rather than restrictive sense.

Indeed, although the systems and processes have been disclosed in the context of certain embodiments and examples, it will be understood by those skilled in the art that the various embodiments of the systems and processes extend beyond the specifically disclosed embodiments to other alternative embodiments and/or uses of the systems and processes and obvious modifications and equivalents thereof. In addition, while several variations of the embodiments of the systems and processes have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosed systems and processes. Any methods disclosed herein need not be performed in the order recited. Thus, it is intended that the scope of the systems and processes herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (for example, hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the processors 45, 52 and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

Documents incorporated by reference in the present patent application are to be considered an integral part of the application except that, to the extent that any terms are defined in these incorporated documents in a manner that conflicts with definitions made explicitly or implicitly in the present specification, only the definitions in the present specification should be considered.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As it is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated. While the embodiments provide various features, examples, screen displays, user interface features, and analyses, it is recognized that other embodiments may be used.

What is claimed is:

1. A head-mounted display device (HMD) comprising:
a see-through display;
a plurality of video cameras, wherein each of the plurality of video cameras is configured to simultaneously capture an image including a region of interest (ROI) within a predefined field of view (FOV);
a distance sensor configured to measure a distance from the HMD to the ROI;
an eye tracker configured to identify a location of a pupil of an eye of a wearer of the HMD; and
at least one processor configured to:
  determine a distance from each of the video cameras to the ROI based on the measured distance from the HMD to the ROI; and
  adjust the display of each image of the images captured by the video cameras on the see-through display based on the determined distances from the video cameras and the location of the pupil to provide an improved display on the see-through display.

2. The HMD according to claim 1, wherein the plurality of video cameras comprise two video cameras positioned symmetrically about a longitudinal plane of the wearer of the HMD such that the plurality of video cameras comprise a left video camera and a right video camera.

3. The HMD according to claim 2, wherein each of the left and right video cameras comprises a sensor, and wherein the FOV is predefined for each of the left and right video cameras by determining a crop region on each sensor.

4. The HMD according to claim 3, wherein the crop regions of the sensors of the left and right video cameras are determined such that the left and right video cameras converge at a preselected distance from the HMD.

5. The HMD according to claim 3, wherein the crop regions of the sensors of the left and right video cameras are determined such that the images captured by the left and right video cameras at a preselected distance from the HMD fully overlap.

6. The HMD according to claim 3, wherein the distance sensor comprises an infrared camera.

7. The HMD according to claim 2, wherein the left and right video cameras each comprise a red-green-blue (RGB) video camera.

8. The HMD according to claim 2, wherein the at least one processor is further configured to at least one of: discard non-overlapping portions of the images or display only the overlapping portions of the images on the see-through display.

9. The HMD according to claim 2, wherein the at least one processor is further configured to determine focus values corresponding to the determined distances and, for each determined distance, apply the corresponding focus value to the left and right video cameras.

10. The HMD according to claim 2, wherein the at least one processor is further configured to determine a magnification value and to magnify the displayed images on the see-through display by the magnification value.

11. The HMD according to claim 10, wherein the at least one processor is further configured to overlay augmented reality images on the magnified images displayed on the see-through display.

12. The HMD according to claim 11, wherein the at least one processor is further configured to magnify the overlaid augmented reality images on the see-through display by the magnification value.

13. The HMD according to claim 2, wherein the adjustment is a horizontal shift based on a horizontal shift value corresponding to the determined distances.

14. A method of providing an improved stereoscopic display on a see-through display of a head-mounted display device comprising:
simultaneously capturing images on a left and a right video camera of the head-mounted display device, the images including a region of interest (ROI) within a predefined field of view (FOV);
measuring a distance from the HMD to the ROI using a distance sensor mounted on or in the head-mounted display device; and
determining a distance from each of the left and right video cameras to the ROI based on the measured distance from the HMD to the ROI;
identifying a location of a pupil of an eye of a user wearing the HMD; and
adjusting the display of each image of the images captured by the left and right video cameras on the see-through display of the head-mounted display device based on the determined distances from the left and right video cameras and the location of the pupil to provide the improved stereoscopic display on the see-through display.

15. A head-mounted display device (HMD) comprising:
a see-through display;
a plurality of video cameras, wherein each of the plurality of video cameras is configured to capture images of a field of view (FOV), having a first angular extent, that is viewable through the display by a user wearing the HMD;
a distance sensor configured to measure a distance from the HMD to a region of interest (ROI) having a second angular extent within the FOV that is less than the first angular extent;
an eye tracker configured to identify a location of a pupil of an eye of the user wearing the HMD; and
a processor, which is configured to process the captured images so as to generate and present on the see-through display a magnified image of the ROI responsively to the location of the pupil,
wherein the magnified image comprises a stereoscopic image, and
wherein the processor is configured to generate the stereoscopic image by presenting left and right magnified images of the ROI on the see-through display, while applying a horizontal shift to the left and right magnified images based on the measured distance.

16. The HMD according to claim 15, wherein the see-through display comprises left and right near-eye displays, and wherein the processor is configured to generate the stereoscopic image by presenting the left and right magnified images of the ROI on the left and right near-eye displays, respectively, while applying the horizontal shift to the left and right magnified images.

17. The HMD according to claim 15, further comprising a tracking system that comprises the distance sensor.

18. The HMD according to claim 17, wherein the distance sensor comprises an infrared camera.

19. The HMD according to claim 15, wherein the processor is configured to overlay an augmented reality image on the magnified image of the ROI that is presented on the see-through display.

* * * * *